US010088915B2

(12) United States Patent
Drum

(10) Patent No.: US 10,088,915 B2
(45) Date of Patent: Oct. 2, 2018

(54) METHOD AND SYSTEM WITH SENSORS FOR SENSING HAND OR FINGER POSITIONS FOR ADJUSTABLE CONTROL

(71) Applicant: Deere & Company, Moline, IL (US)

(72) Inventor: Jonathan E. Drum, Raleigh, NC (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 15/200,668

(22) Filed: Jul. 1, 2016

(65) Prior Publication Data
US 2018/0004310 A1  Jan. 4, 2018

(51) Int. Cl.
*G06F 3/033* (2013.01)
*G09G 5/08* (2006.01)
*G06F 3/0338* (2013.01)
*G06F 3/044* (2006.01)
*G06F 3/041* (2006.01)
*G05G 1/04* (2006.01)
*G05G 9/047* (2006.01)

(52) U.S. Cl.
CPC ............ *G06F 3/0338* (2013.01); *G06F 3/044* (2013.01); *G06F 3/0416* (2013.01); *G05G 1/04* (2013.01); *G05G 9/047* (2013.01)

(58) Field of Classification Search
None
See application file for complete search history.

(56) References Cited

U.S. PATENT DOCUMENTS

| 6,184,865 | B1 | 2/2001 | Zimmerman et al. | |
|---|---|---|---|---|
| 2004/0011154 | A1* | 1/2004 | Dybro | E02F 9/2004 74/473.3 |
| 2007/0002016 | A1 | 1/2007 | Cho et al. | |
| 2007/0152966 | A1 | 7/2007 | Krah et al. | |
| 2008/0250889 | A1* | 10/2008 | Mack | B60K 20/02 74/471 XY |

(Continued)

FOREIGN PATENT DOCUMENTS

| EP | 2323022 A2 | 5/2011 |
|---|---|---|
| WO | 2010005185 A2 | 1/2010 |
| WO | 2015191409 A1 | 12/2015 |

OTHER PUBLICATIONS

Pham, A. "E3: Microsoft Shows Off Gesture Control Technology for Xbox 360." The Business and Culture of Our Digital Lives from the Los Angeles Times, Jun. 1, 2009 [online blog], [retrieved on Jul. 1, 2016]. Retrieved from the Internet <URL: http://latimesblogs.latimes.com/technology/2009/06/microsofte3.html>.

(Continued)

*Primary Examiner* — Stephen T Reed

(57) ABSTRACT

A handle is adapted to receive one or more fingers or a portion of the hand. A set of sensors is mounted on or near the surface of the handle. Each sensor associated with a different region of the handle. A detector is arranged to detect contact of one or more of the sensors, by one or more fingers or a portion of a hand, to generate an observed touch-point map for the handle for a respective sampling interval. A controller can generate a gain or control response ratio in the electrical signals outputted in response to the observed touch-point map matching or being substantially similar to a reference touch-point map, where the electrical signals are derived from movement or displacement of the handle by a user.

19 Claims, 15 Drawing Sheets

(56) References Cited

U.S. PATENT DOCUMENTS

| | | |
|---|---|---|
| 2010/0275589 A1 | 11/2010 | Meyers et al. |
| 2011/0234495 A1 | 9/2011 | Chan et al. |
| 2014/0218309 A1 | 8/2014 | Park |
| 2016/0026216 A1 | 1/2016 | Novet |

OTHER PUBLICATIONS

Wheeler, K.R., and Jorgensen, C.C. "Gestures as Input: Neuroelectric Joysticks and Keyboards." Institute of Electrical and Electronics Engineers Pervasive Computing 2, vol. 2, 2003, pp. 56-61 [online], [retrieved on Jul. 1, 2016]. Retrieved from the Internet: <http://ieeexplore.ieee.org/xpls/abs_all.jsp?arnumber=1203754&tag=1><DOI: 10.1109/MPRV.2003.1203754>.

European Search Report issued in counterpart application No. 17178096.8 dated Nov. 6, 2017. (15 pages).

European Search Report issued in counterpart application No. 17178096.8, dated Mar. 7, 2018 (16 pages).

\* cited by examiner

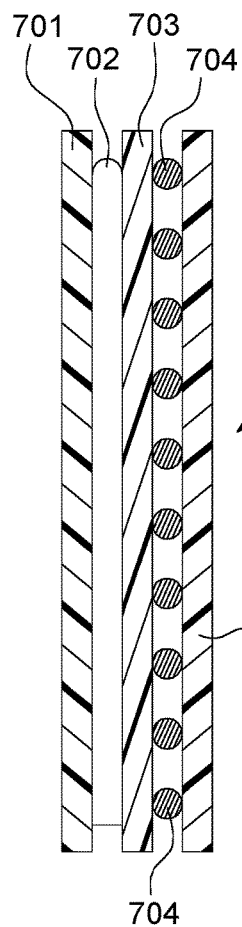
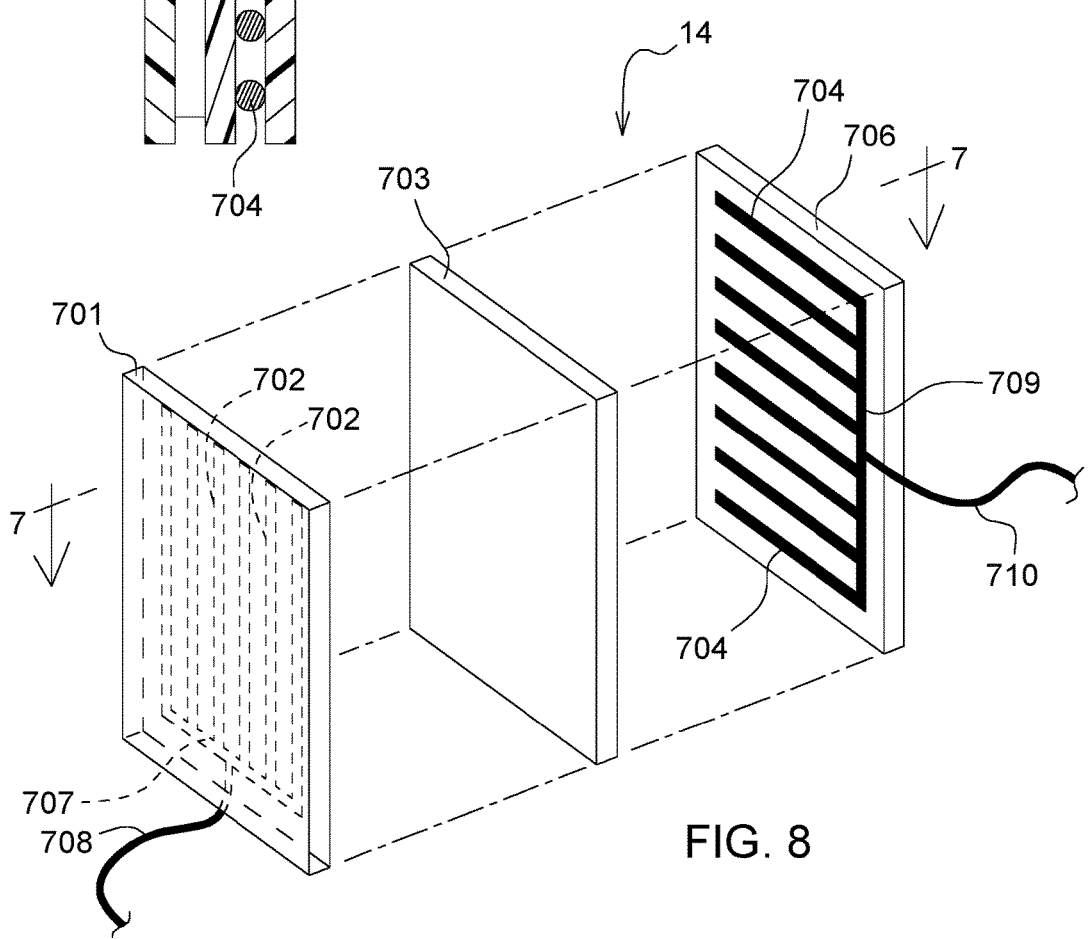
FIG. 7
FIG. 8

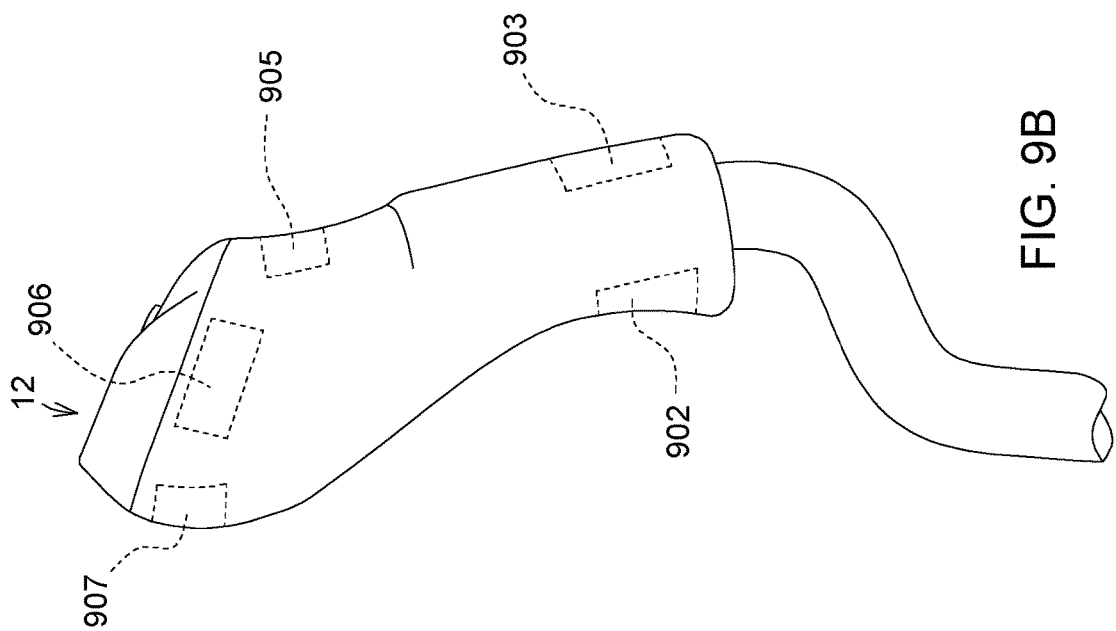
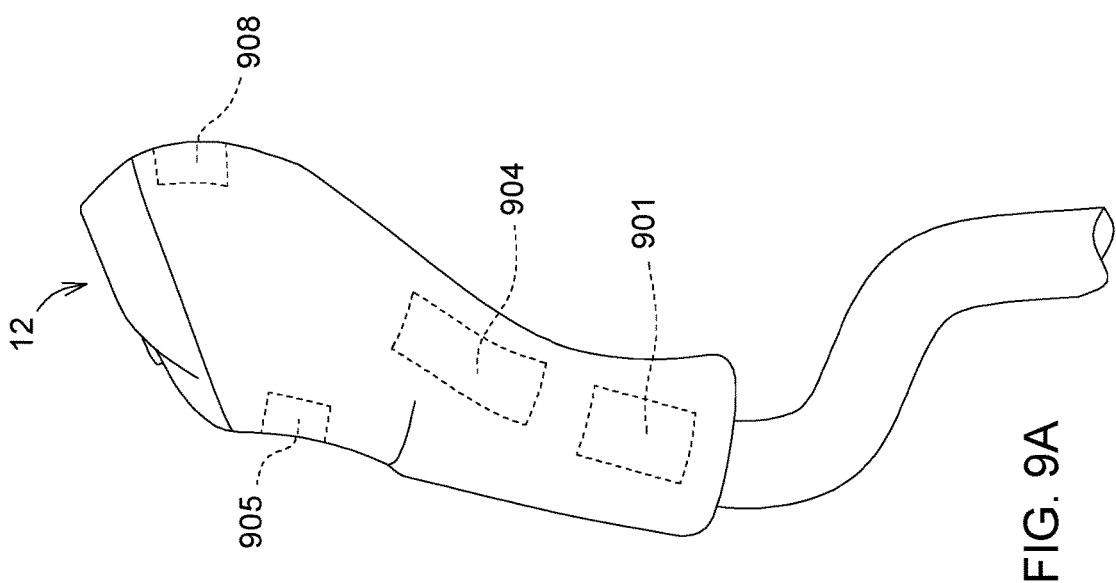

| Sensor Identifier | Hand Contact |
|---|---|
| First Sensor (901) | Yes |
| Second Sensor (902) | Yes |
| Third Sensor (903) | No or Don't Care |
| Fourth Sensor (904) | Yes |
| Fifth Sensor (905) | Yes |
| Sixth Sensor (906) | Yes |
| Seventh Sensor (907) | Yes |
| Eighth Sensor (908) | Yes |

FIG. 14

| Sensor Identifier | Hand Contact |
|---|---|
| First Sensor (901) | Yes |
| Second Sensor (902) | Yes |
| Third Sensor (903) | Yes |
| Fourth Sensor (904) | Yes |
| Fifth Sensor (905) | No |
| Sixth Sensor (906) | No |
| Seventh Sensor (907) | No |
| Eighth Sensor (908) | No |

FIG. 15

| Sensor Identifier | Hand Contact |
|---|---|
| First Sensor (901) | Yes or Don't Care |
| Second Sensor (902) | No |
| Third Sensor (903) | No |
| Fourth Sensor (904) | Yes |
| Fifth Sensor (905) | Yes |
| Sixth Sensor (906) | Yes |
| Seventh Sensor (907) | No |
| Eighth Sensor (908) | Yes or Don't Care |

FIG. 16

| Sensor Identifier | Hand Contact |
|---|---|
| First Sensor (901) | No |
| Second Sensor (902) | No |
| Third Sensor (903) | No |
| Fourth Sensor (904) | No |
| Fifth Sensor (905) | Yes |
| Sixth Sensor (906) | Yes |
| Seventh Sensor (907) | Yes |
| Eighth Sensor (908) | Yes |

METHOD AND SYSTEM WITH SENSORS FOR SENSING HAND OR FINGER POSITIONS FOR ADJUSTABLE CONTROL

FIELD

This disclosure relates to method and system with sensors for sensing hand or finger positions for adjustable control, such as control of an actuator, electronic device, vehicle, or implement.

BACKGROUND

In certain prior art, a joystick sensor can merely detect movement of a user's hand to generate corresponding electrical signals. For example, for a given movement, a controller, associated with the joystick sensor, generates uniform electrical control signals regardless of how the user actually holds, grips, or grasps the joystick. In some prior art, the user can manually enter or manually press one or more additional switches associated with the user interface to enable, disable or change a signal output of the joystick sensor. The user's manual activation or pressing of additional mechanically-operated switches can be inefficient, non-ergonomic or burdensome. One possible application of the joystick sensor is to control a vehicle, such as off-road heavy equipment, which can be operated for lengthy time periods. Accordingly, there is a need for a method and system with hand sensors for sensing hand or finger positions that can detect and react automatically to the user's hand or finger positions consistent with the user's expectations, preferences, or programming of a controller or controlled device.

SUMMARY

In one embodiment, a method and system with hand sensors for sensing hand or finger positions is capable of converting hand or finger positions or movements (e.g., or both positions and movements) into electrical signals. A handle is adapted to receive one or more fingers or a portion of the hand. A set of tactile sensors (e.g., capacitive sensors) is mounted on or near the surface of the handle. Each sensor associated with a different region of the handle. A detector is arranged to detect contact of one or more of the sensors, by one or more fingers or a portion of a hand, to generate an observed touch-point map for the handle for a respective sampling interval. A controller can generate a gain or control response ratio in the electrical signals outputted (e.g., to an actuator) in response to the observed touch-point map matching or being substantially similar to a reference touch-point map, where the electrical signals are derived from movement or displacement of the handle by a user.

BRIEF DESCRIPTION OF THE DRAWINGS

FIG. 7 shows a cross-section of one embodiment of an illustrative tactile sensor or capacitive sensor that can be used for the hand sensor for sensing hand or finger positions.

FIG. 8 is an exploded perspective view of one embodiment of an illustrative capacitive sensor.

FIG. 9A is a perspective view of one side of a handle with one or more embedded tactile or capacitive sensors.

FIG. 9B is a perspective view of an opposite side of the handle of FIG. 9A with one or more embedded tactile or capacitive sensors.

FIG. 14 is one possible chart or look-up table associated with sensors and contact points on a handle, which can define a corresponding illustrative grip.

FIG. 15 is another possible chart or look-up table associated with sensors and contact points on a handle, which can define a corresponding illustrative grip.

FIG. 16 is yet another possible chart or look-up table associated with sensors and contact points on a handle, which can define a corresponding illustrative grip.

FIG. 17 is still another possible chart or look-up table associated with sensors and contact points on a handle, which can define a corresponding illustrative grip.

DETAILED DESCRIPTION

As used in this document, "configured to, adapted to, or arranged to" mean that the data processor is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any drawing in this disclosure. Alternately, separately from or cumulatively with the above definition, "configured to, adapted to, or arranged to" can mean that the electronic data processing system comprises one or more components described herein as software modules, equivalent electronic hardware modules, or both to execute any referenced functions, mathematical operations, calculations, determinations, processes, methods, algorithms, subroutine.

Throughout the drawings in this document, like reference numbers indicate like elements or features of devices or systems, or like steps or procedures of methods.

Figure 1A:
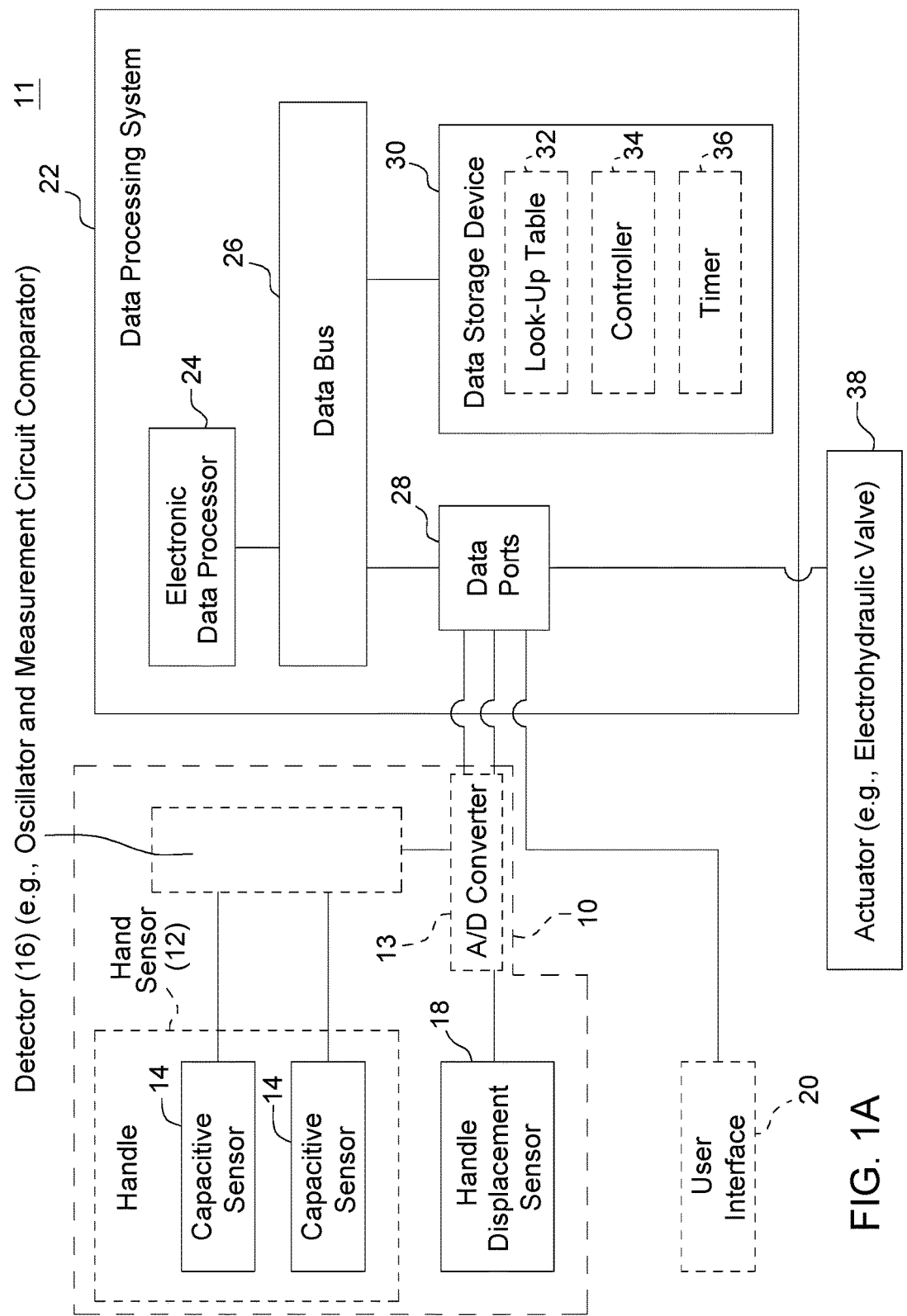
FIG. 1A is a block diagram of one embodiment of a system with hand sensor for sensing hand or finger positions.

FIG. 1A is a block diagram of one embodiment of a system 11 with a hand sensor 12 for sensing hand or finger positions on a handle (e.g., joystick), alone or in conjunction with any movement of the handle by an operator or user.

In FIG. 1A, the system 11 comprises a hand sensor 12 that comprises one or more of the following: (1) a handle with one or more tactile sensors or capacitive sensors 14, and (2) a handle displacement sensor 18 for detecting movement (e.g., acceleration, velocity), position or orientation of the sensor 14, (3) and an optional detector 16 for detecting a change in capacitance or other electrical parameter from a user's finger, portion of a finger, hand, or portion of a hand contacting or approaching (in close proximity) one or more tactile or capacitive sensors 14.

In one configuration, one or more tactile or capacitive sensors 14, the handle displacement sensor 18 and the optional detector 16, and an optional analog-to-digital converter 13 comprise a detection module 10.

In one embodiment, the hand sensor 12 is coupled to an electronic data processing system 22, which may comprise a controller. In turn, the data processing system 22 may be coupled to or connected to an actuator 38 (e.g., electrohydraulic valve) for controlling a mechanism or device, such as a steering system, braking system, tool, or implement (e.g., loading bucket coupled to a boom and arm) associated with a vehicle. An actuator 38 may comprise an electric motor, a linear actuator, a relay, a solenoid, a micro-electromechanical system (MEMS), an electrohydraulic valve, an electrically controlled hydraulic pump, or an electrohydraulic pump, or another electrical or hydraulic machine.

Further, the data processing system 22 may be coupled to a user interface 20, such as a keypad, keyboard, display, touch screen display, switch or other device for inputting or outputting data. For example, inputting or output data into the data processing system 22 may facilitate establishing or modifying a look-up table 32, file or other data structure associated with grip data maps, touch-point maps, or reference maps of user contact points on the handle and corresponding gains (or corresponding control response ratio) for the electrical signals outputted to control the actuator 38 (e.g., electrohydraulic valve). The data in the look-up table 32 or other data structure may be consistent with user definable preferences, default factory settings, or other settings.

The control response ratio or C/R refers to the ratio of input control signal to output control signal. The electronic data processing system 22 can be used to establish an output control signal provided to the actuator 38 or an electronic device based on an input control signal provided by the hand sensor 12. In the context of a machine or vehicle, higher values of C/R yield higher control resolution and slower, more precise machine movements for a reference movement of the handle (e.g., joystick sensor). Precise movements are desirable for moving machinery or implements in confined spaces or for meeting exact specifications or work plans, such as construction tasks around building structures, fiber optic cable, pipelines, gas lines, and electric lines, for example. Conversely, lower C/R yield lower control resolution and quicker, less precise machine movements for the same reference movement of the handle.

If an operator of a vehicle in the field needs more precise movement or faster movement from a machine, to some limited extent the operator can adjust his grip on the handle to attempt to impact the C/R (or gain) in the direction that is suited to the task at hand. For instance, to adjust C/R, the operator can adjust the lever length of the joystick control by grip selection on the handle. The combination of using more sensitive smaller muscles (for finger grips) and increasing the lever length (by gripping at the top of the stick) allows the operator to mechanically increase C/R (and conversely lower gain) to some extent. However, the increase is limited by the dexterity and skill of the operator to use grip positions that can become awkward, extreme or uncomfortable over time.

Here, the disclosure supports a leveraged, automatic adjustment or user-definable adjustment in C/R (or gain) in response to: (1) the hand sensor's detection of a hand grip of an operator, (2) the data processing system's interpretation of data from tactile or capacitive sensors 14 to identify of the particular hand grip, and (3) the data processing system's assignment corresponding C/R (or gain) associated with the identified particular hand grip in accordance with a look-up table 32 or data structure stored in the data storage device 30. In accordance with one example, if the data processing system 22 identifies a closed first hand grip of the operator on the handle, the C/R can be lowered from a reference, neutral or baseline C/R (e.g., medium C/R). Accordingly, an operator can use the closed first grip for fast, gross motion such as loading trucks.

In accordance with another example, if the data processing system 22 identifies a fingertip grip or top handling grip of the operator on the handle, the C/R can be increased from the reference, neutral or baseline C/R. Accordingly, the operator can use the fingertip grip for fine control movements such as laying pipe or digging near a foundation or footing consistent with prudent, safe and customary industry practices.

Further, the C/R can be adjusted with more gain or sensitivity to particular corresponding grips than is possible through any resultant mechanical lever adjustment associated with a grip change. For example, such adjustments can be set to provide uniform gain or sensitivity enhancement that is based on operator or user preferences or historical machine settings from one or more previous operators. The hand sensor 12 and associated data processing system 22 is well suited for achieving both precision for the most delicate operations and high speed for productivity operations.

In FIG. 1A, the electronic data processing system 22 comprises an electronic data processor 24, a data storage device 30, and one or more data ports 28, coupled to a data bus 26. In one embodiment, the data processor 24 may communicate with one or more of the following devices via the data bus 26: data storage device 30, and one or more data ports 28.

The data processor 24 may comprise a microcontroller, a microprocessor, a programmable logic array, an application specific integrated circuit (ASIC), a digital signal processor, or another device for processing data, manipulating, accessing, retrieving, and storing data. A data storage device 30 may comprise electronic member, non-volatile electronic memory, an optical storage device, a magnetic storage device, or another device for storing digital or analog data on a tangible storage medium, such as an optical disk, a magnetic disk, or electronic memory. Each data port 28 may comprise a buffer memory, a transceiver or both for interfacing with other network elements over a vehicle data bus (e.g., Controller Area Network or Ethernet) of a communications network.

The data storage device 30 may store program instructions or one or more software modules, such as a look-up table 32 or other data structures, a controller 34 and a timer 36. In one embodiment, the data processor 24 may support a programming module, a guidance module and a mode data processor 24. The look-up table 32, files, data records, or other data structures can store data about the relationship between sensor contact data for corresponding sensor identifiers, a corresponding hand grip associated with the sensor contact data (or a constellation of capacitive sensors 14 on or in the grip), and a respective gain, control gain or C/R applied to a reference or normal movement of the handle displacement sensor 18.

Each data port 28 may comprise a transceiver, an input/output device, a data port, a data latch, buffer memory, or other device for communicating, transmitting, or receiving data (e.g., via the vehicle data bus 50) or from the detection module 10.

In one embodiment, the hand sensor 12 comprises a handle displacement sensor 18. The handle displacement sensor 18 may comprise an encoder or handle position sensor for estimating a position, direction of rotation, angular position of the handle. For example, the handle displacement sensor 18 may comprise a magnet mounted, embedded or secured in the handle, a magnetic field sensor (e.g., Hall effect sensor) spatially separated from the magnet, and an electronic circuit for sensing the shaft rotational speed and/or rotational direction based on the detectable changes in the magnetic field.

In one embodiment, the hand sensor 12 comprises a handle associated with set of tactile or capacitive sensors 14 at known positions or orientations on the handle (e.g., joystick sensor handle). Collectively, the known positions or orientations of the tactile or capacitive sensors 14 on the handle may be referred to as a constellation or sensor map. The reference contact points of the hand or fingers on the tactile or capacitive sensors 14 is referred to as a reference touch-point map. The observed contact points of the hand or fingers on the tactile or capacitive sensors 14 is referred to an observed touch-point map. As used herein, touch-point map may refer to a reference touch-point map for a corresponding identified grip or an observed touch-point map, or both. In one example, the reference touch-point map is associated with a grip type of one or more fingers or a portion of the hand on the handle, wherein the grip type is selected from the group comprising one or more of the following: a hand grip, a finger grip, a full grip, a base grip, an open palm grip, a fingertip grip, a hand grip with closed fist, a hand grip with open hand, a finger grip with side handling, and a finger grip with top handling. In another example, each reference touch-point map is associated with a respective gain or respective control response ratio that is stored in a data storage device. In yet another example, each reference touch-point map is associated with a respective gain (or respective control response ratio) and respective identified grip of the user's hand, portion of the hand or fingers on the handle.

In one configuration, a handle has with one or more capacitive sensors 14 associated with an exterior surface of the handle. For example, one or more capacitive sensors 14 are embedded in the a layer near or at the exterior surface of the handle. The handle can receive one or more fingers or a portion of the hand. The hand can grip, grasp or otherwise contact the handle or one or more capacitive sensors 14 in accordance with one or more identifiable grips. In one embodiment, a set of capacitive sensors 14 on or near the surface of the handle. For example, each sensor associated with a different region of the handle.

A detector 16 is arranged to detect contact of one or more of the tactile or capacitive sensors 14 to generate a touch-point map for the handle for a respective sampling interval. In one configuration, the detector 16 comprises an oscillator and a measurement circuit comparator.

In one configuration, if the detector 16 does not provide a digital signal output, an optional analog-to-digital converter 13 converts an analog signal of the detector 16 into a digital signal. Similarly, if the handle displacement sensor 18 does not provide a digital signal output, an optional analog-to-digital converter 13 converts an analog signal of the handle displacement sensor 18 to a digital signal. The optional analog to digital converter 13 is illustrated as a block in dashed lines in FIG. 1A. The analog to digital converter 13 could include one or more analog-to-digital converters 13 or a multiplexer that supports multiple inputs to share a single analog-to-digital converter 13 with output provided to the electronic data processing system 22 via one or more data ports 28.

The handle displacement sensor 18 derives baseline or normal electrical signals from movement or displacement of the handle by a user. A data processor 24, controller 34, or data processing system 22 generates a gain (or C/R adjustment) in the baseline or normal electrical signals outputted by the handle displacement sensor 18 in response to the movement of the operator and in response to the identified grip of the operator on one or more capacitive sensors 14. The identified grip on the handle is based on the observed contact points of the grip or hand on the capacitive sensors 14 that match a corresponding touch-point map based on a look-up table 32 or other data structure of reference contact points of the capacitive sensors 14 (by capacitor sensor identifier) and corresponding gains.

In one embodiment, the handle comprises a joy stick or joystick sensor that produces the electrical signal based on movement or displacement of the handle with respect to the a reference coordinate system. The reference coordinate system can represent coordinates in the X-Y plane of a Cartesian coordinate system.

The touch-point map is associated with one or more of the following grips: a hand grip, a finger grip, a full grip, a base grip, an open palm grip, a fingertip grip, a hand grip with closed fist, a hand grip with open hand, a finger grip with side handling, and a finger grip with top handling. In some instances, the touch-point map is associated with a gesture or posture of how a user grips or interacts with the handle with the user's fingers, palm or other portions of a user's hand.

The observed touch point map is sensed by one or more tactile or capacitive sensors 14, or provided at an output of the optional detector 16 or analog-to-digital converter 13. Meanwhile, the reference touch point map for corresponding grips is stored in the data storage device 30. During operation of the vehicle, the particular operator grip can be identified for each sampling interval based on correspondence, correlation or matching of the observed touch point map to a best candidate among the respective reference touch point maps.

In one embodiment, the data processing system 22 provides an electrical control signal with a corresponding gain (or equivalent C/R) selected based on the operator's identified grip, grasp or contact with the handle or sensor positions on the handle. In one example, the identified grip can be identified if the observed touch point map sufficiently matches, corresponds or correlates to the reference touch point map based on meeting or exceeding certain threshold percentage match for the observed touch point map and the reference touch point map for the identified grip. In another example, the identified grip can be identified if the observed touch point map sufficiently matches, corresponds or correlates to the reference touch point map based on meeting or exceeding certain threshold percentage match for the observed touch point map and the reference touch point map for the identified grip, where each "don't-care state" (see, e.g., third sensor in FIG. 14) for a reference touch point is excluded from a denominator used to determine the threshold percentage, which comprises a numerator of observed touch points of an affirmative status ("yes," see, e.g., first sensor in FIG. 14) for corresponding sensor identifiers divided by a denominator of the reference touch points of an affirmative status for the same corresponding sensor identifiers. In other words, in some embodiments, affirmative status only count toward matching if the affirmative status applies to the same sensor identifier in the observed touch-point map and the respective reference touch-point map.

In one example, the data processing system 22 generates a control signal or command for an actuator 38 (e.g., electrohydraulic valve) based on the gain (or C/R) to increase hydraulic flow to a first flow level that is higher than a second flow level (e.g., moderate or baseline flow level) if the data processor 24 identifies an identified hand grip of the handle for the sampling interval, where the identified hand grip is within set of hand grips that is associated with a gain setting, a gain adjustment, C/R setting, or C/R adjustment to increase the hydraulic flow. For example, such identified grips, which are associated with increased hydraulic flow, may comprise one or more of the following: closed first hand grip and open hand, hand grip, which tend to be compatible with coarse control of an implement (or tool) controlled by the hydraulic valve.

In another example, the actuator 38 (e.g., electrohydraulic valve) is controlled based on the gain (or C/R) to decrease hydraulic flow to a second flow level that is lower than a first flow level (e.g., moderate or baseline flow level) if the data processor 24 identifies an identified hand grip (or identified finger grip) of the handle for the sampling interval, where the identified hand grip is within a set of hand grips that is associated with a gain setting, a gain adjustment, C/R setting, or C/R adjustment to increase the hydraulic flow. For example, such identified grips, which are associated with decrease hydraulic flow, may comprise one or more of the following: finger grip top handing or finger grip side handling, which tend to be compatible with fine control of an implement (or tool) controlled by the hydraulic valve.

In one configuration, a timer 36 is associated with the data processor 24 or controller 34 to determine if the handle is not contacted by a user's hand or fingers for a minimum threshold period. A user interface 20 is coupled to the data processor 24. The data processor 24 or controller 34 is adapted to generate an alert to the user interface 20 or to disable the handle displacement sensor 18 for one or more time intervals if the handle is not contacted by a user's hand or fingers for a minimum threshold period.

Figure 1B:
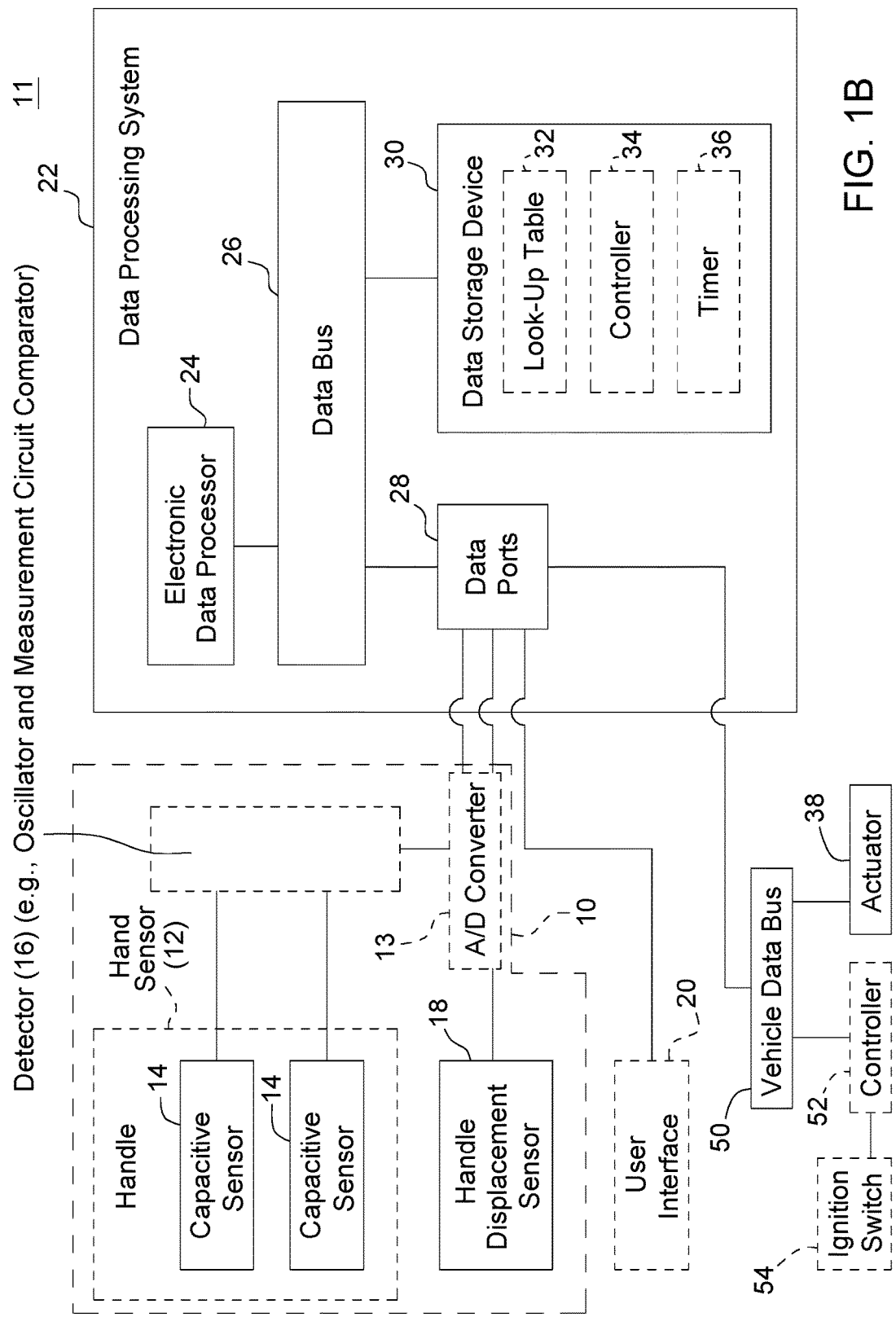
FIG. 1B is a block diagram of another embodiment of a system with hand sensors for sensing hand or finger positions.

FIG. 1B is a block diagram of system with hand sensor 12 for sensing hand or finger positions that is similar to the system of FIG. 1A, except the system of FIG. 1B further comprises a vehicle data bus 50, an optional data processor 24 and an optional ignition switch 54. Like reference numbers in FIG. 1A and FIG. 1B indicate like elements.

The vehicle data bus 50 is coupled to the electronic data processing system 22 or to a data port 28 or the electronic data processing system 22. In turn, an actuator 38 (e.g., electrohydraulic actuator 38) is coupled to the vehicle data bus 50. Further, an optional data processor 24 may be coupled to the vehicle data bus 50. The optional data processor 24 may provide an interface of the ignition switch 54 to the vehicle data bus 50 to activate or enable the hand sensor 12 (e.g., capacitive sensors 14 and the handle displacement sensor 18) when the ignition switch 54 is in an on-state and to disable or deactivate the hand sensor 12 when the ignition switch 54 is in an off-state.

Figure 2:
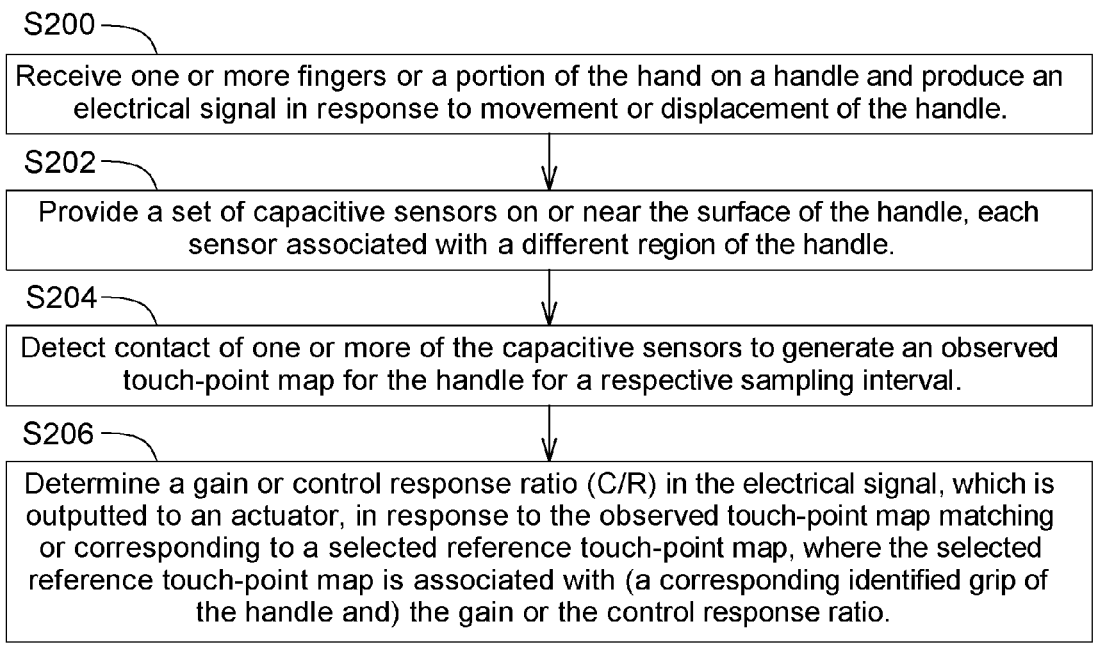
FIG. 2 is a flow chart of one embodiment of a method with a hand sensor for sensing hand or finger positions on a handle that can be converted into definable electrical signals, alone or in conjunction with any movement of the handle (e.g., joystick handle).

FIG. 2 is a flow chart of one embodiment of a method with a hand sensor 12 for sensing hand or finger positions that can be converted into definable electrical signals. The method of FIG. 2 begins in step S200.

In step S200, a handle (e.g., joystick handle) receives contact of one or more fingers or a portion of the hand by an operator or user and a handle displacement sensor 18 produces an electrical signal in response to movement or displacement of the handle.

In step S202, a set of capacitive sensors 14 or other tactile sensors are provided on or near the surface of the handle, where each sensor is associated with a different region of the handle. For example, the sensors may be arranged in a constellation at known regions of the handle.

In step S204, detector 16 or data processor 24 detects contact of one or more of the capacitive sensors 14 or other tactile sensors by fingers or a hand to generate an observed touch-point map for the handle for a respective sampling interval. For example, the observed touch-point map indicates the identifiers of the corresponding capacitive sensors 14 or tactile sensors that the operator or user contacts with a hand portion or finger during a sampling interval.

In step S206, a data processor 24, data processor 24, or electronic data processing system 22 determines a gain (e.g., gain setting or a gain adjustment) or control response ratio (e.g., a C/R setting or a C/R adjustment) for the electrical signal, which is outputted to an actuator 38 (or electronic device) associated with a vehicle or implement, in response to the observed touch-point map matching or corresponding to a selected reference touch-point map, where the selected reference touch-point map is associated with (a corresponding identified grip of the handle and) the gain or control response ratio (e.g., corresponding gain setting, gain adjustment, C/R setting, or C/R adjustment). For example, the observed touch point map matches or corresponds to the reference touch point map (e.g., selected touch point map) if a observed percentage of touch points (e.g., for corresponding capacitor sensors in different regions of the handle) meets or exceeds a threshold percentage of touch points for the reference touch point map.

The reference touch point map may comprise sensor identifiers and related status as to whether the operator grip or fingers contact each capacitive sensor 14 or not, or whether the capacitive sensor 14 has a don't care state, such as the reference touch-point maps of FIG. 14 through FIG. 17, inclusive. If a particular capacitive sensor 14 has a don't care state, the reference grip can be associated with the contact or no contact of the finger at that particular sensor. The reference touch point may be stored as a look-up table 32, a file or another data structure in the data storage device 30 along with a plurality of other reference touch-point maps. In one embodiment, the data processor 24, data processor 24 or electronic data processing system 22 searches for candidate reference touch point maps in the data storage device that most closely match, or that is substantially similar to, the observed touch-point map to identify the selected reference touch point map and its corresponding identified grip or posture.

Step S206 may be carried out in accordance with various techniques which may be applied separately or cumulatively. Under a first technique, the data processor 24 or data processing system 22 stores the reference touch-point map in a data storage device along with a plurality of other reference touch-point maps. Further, the data processor 24 or data processing system 22 searches candidate reference touch-point maps in the data storage device for the reference touch point map that matches or is substantially similar to the observed touch-point map.

Under a second technique, the data processor 24 or data processing system 22 associates the reference touch-point map with a grip type selected from a group comprising one or more of the following: a hand grip, a finger grip, a full grip, a base grip, an open palm grip, a fingertip grip, a hand grip with closed fist, a hand grip with open hand, a finger grip with side handling, and a finger grip with top handling.

Under a third technique, that data processor 24 or data processing system 22 identifies a user's grip of the handle if the observed touch point map sufficiently matches, corresponds or correlates to the reference touch-point map based on meeting or exceeding certain threshold percentage match for the observed touch-point map and the reference touch point map for an identified grip.

Under a fourth technique, the data processor 24 or data processing system 22 excludes each don't-care state in the reference touch-point map from a determination of the threshold percentage.

Under a fifth technique, the data processor 24 or data processing system 22 associates each reference touch-point map with a respective gain or respective control response ratio that is stored in a data storage device.

Figure 3:
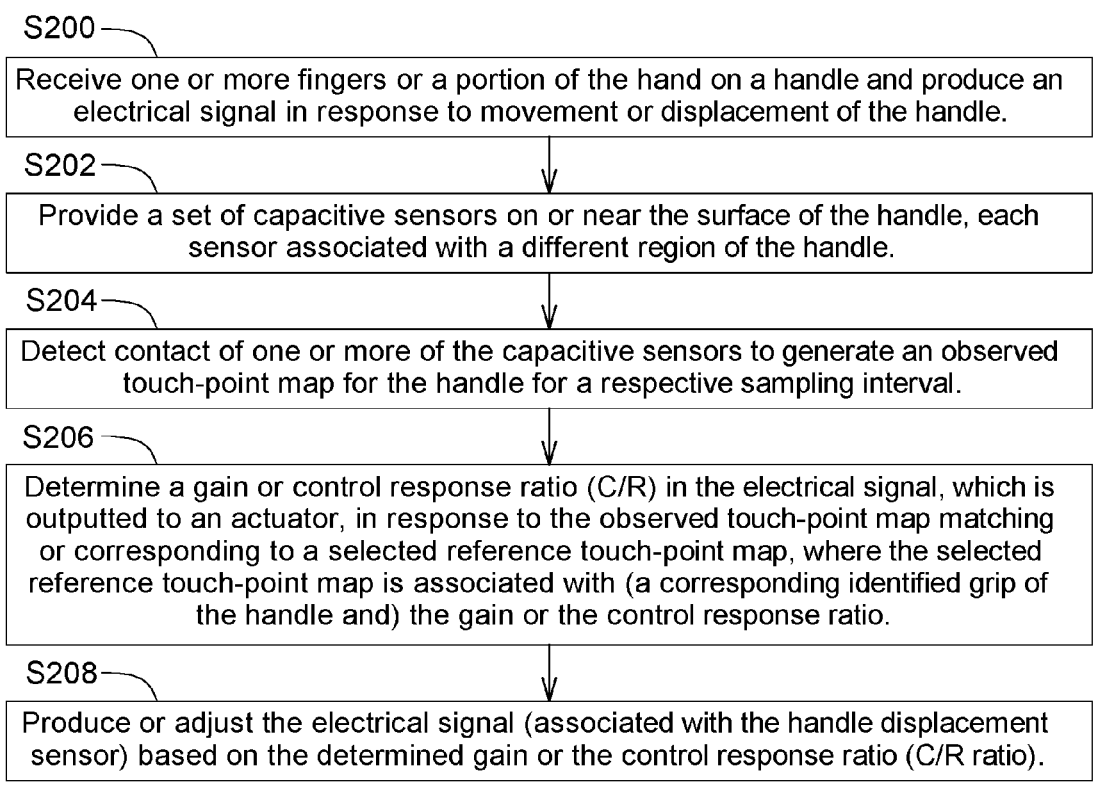
FIG. 3 is a flow chart of another embodiment of a method with a hand sensor for sensing hand or finger positions on a handle that can be converted into definable electrical signals, alone or in conjunction with any movement of the handle.

FIG. 3 is a flow chart of another embodiment of a method with a hand sensor 12 for sensing hand or finger positions that can be converted into definable electrical signals. The method of FIG. 3 is similar to the method of FIG. 2, except the method of FIG. 3 further includes step S208. Like reference numbers in FIG. 2 and FIG. 3 indicate like elements.

In step S208, the data processor 24, data processor 24 or electronic data processing system 22 produces or adjusts the electrical signal (associated with the handle displacement sensor 18) based on the determined gain or the control response ratio (C/R). For example, the handle displacement sensor 18 provides an initial electrical signal that the data processor 24 or data processor 24 can adjust to yield a revised electrical signal that is amplified or attenuated with respect to the initial electrical signal; or more sensitive or less sensitive than initial electrical signal to movement or displacement of the handle with respect to a reference coordinate system.

Figure 4:
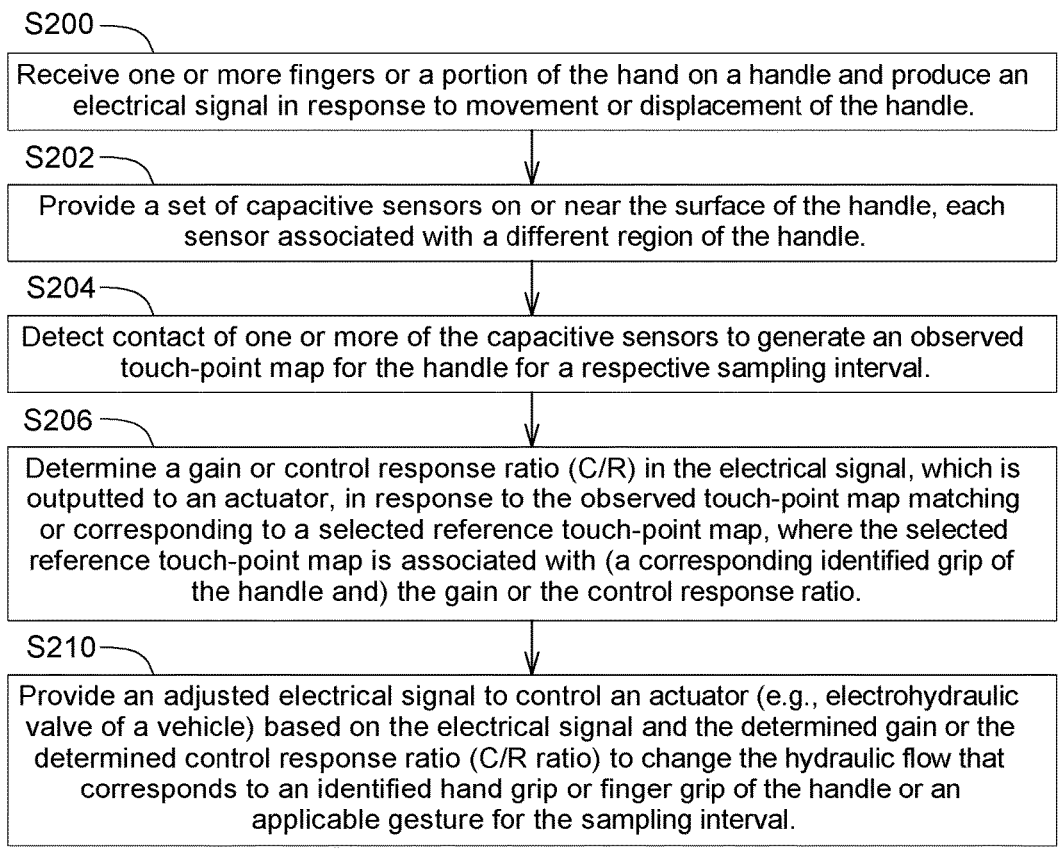
FIG. 4 is a flow chart of yet another embodiment of a method with a hand sensor for sensing hand or finger positions on a handle that can be converted into definable electrical signals, alone or in conjunction with any movement of the handle.

FIG. 4 is a flow chart of yet another embodiment of a method with a hand sensor 12 for sensing hand or finger positions that can be converted into definable electrical signals. The method of FIG. 4 is similar to the method of FIG. 2, except the method of FIG. 4 further includes step S210. Like reference numbers in FIG. 2 and FIG. 4 indicate like steps or procedures.

In step S210, an electronic data processing system 22 or data processor 24 provides an adjusted electrical signal to control an actuator 38 (e.g., electrohydraulic valve of a vehicle) based on the electrical signal and the determined gain or the determined control response ratio (C/R) to change (e.g., increase or decrease) the hydraulic flow that corresponds to an identified hand grip or finger grip of the handle or an applicable gesture for the sampling interval.

Figure 5:
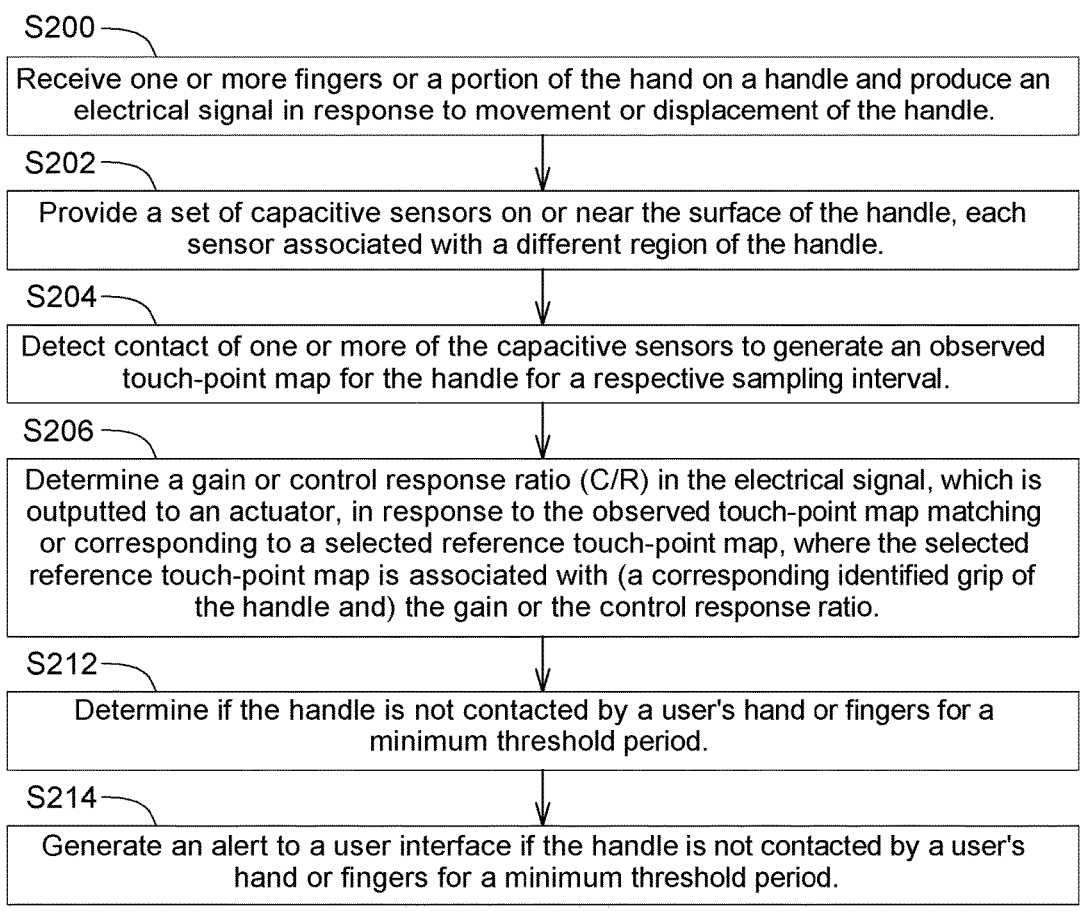
FIG. 5 is a flow chart of still another embodiment of a method with a hand sensor for sensing hand or finger positions of a handle that can be converted into definable electrical signals, alone or in conjunction with any movement of the handle.

FIG. 5 is a flow chart of still another embodiment of a method with a hand sensor 12 for sensing hand or finger positions that can be converted into definable electrical signals. The method of FIG. 5 is similar to the method of FIG. 2, except the method of FIG. 5 further includes step S212 and step S214. Like reference numbers in FIG. 2 and FIG. 5 indicate like steps or procedures.

In step S212, the electronic data processing system 22, the data processor 24, or the timer 36 determines if the handle is not contacted by a user's hands or fingers (or portion of the hand or fingers) for a minimum threshold period.

In step S214, the electronic data processing system 22, the data processor 24, or the timer 36 generators an alert to a user interface 20 if the handle is not contacted by a user's hand or fingers (or a portion of the hand or fingers) for a minimum threshold period. For example, the alert may comprise an audible alert, a visual alert, an audio message, a visual message, a siren or an alarm.

Figure 6A:
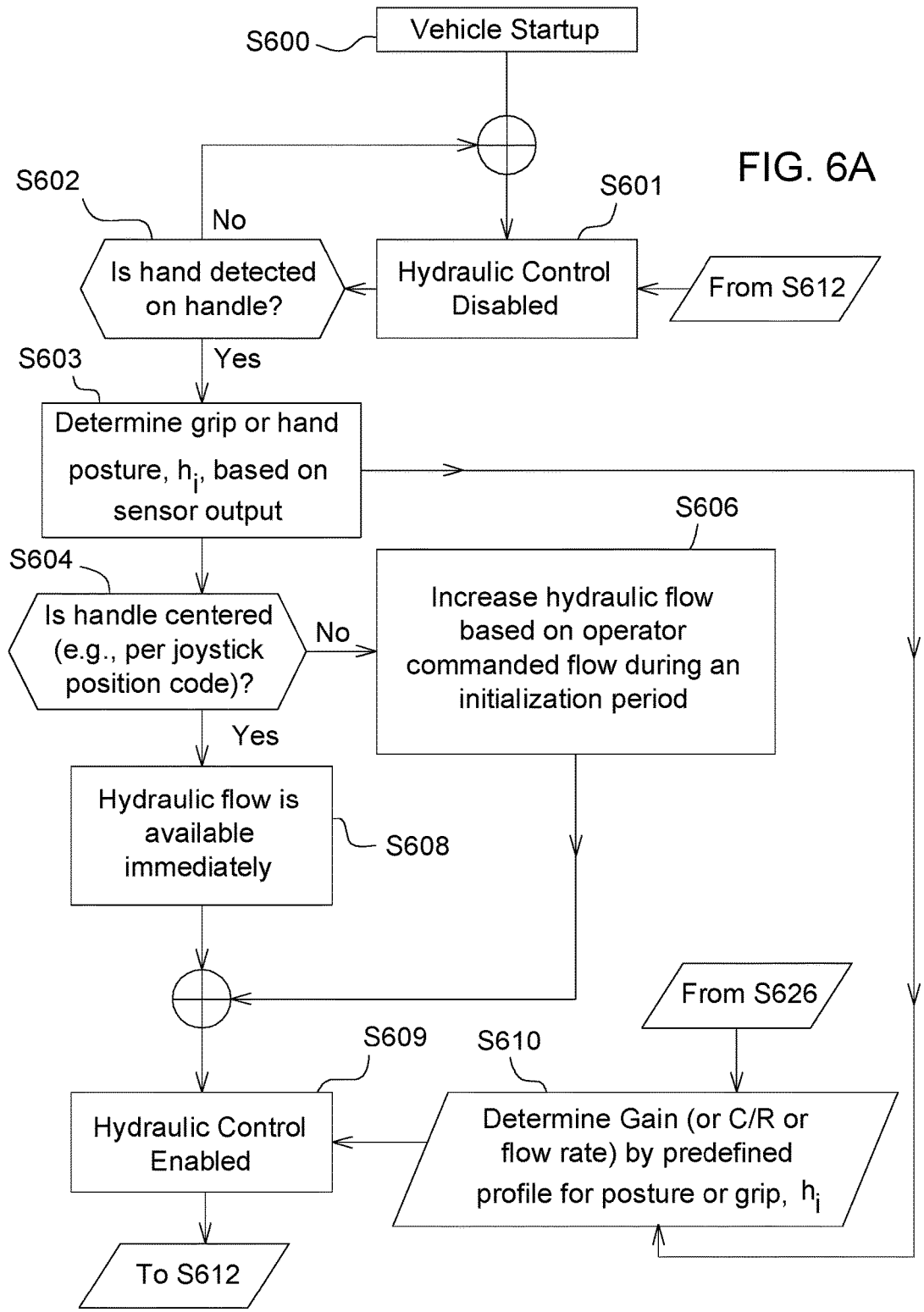
FIG. 6A and FIG. 6B, collectively, are a flow chart of one embodiment of a method with a hand sensor for sensing hand or finger positions that are used to control a vehicle.
Figure 6B:
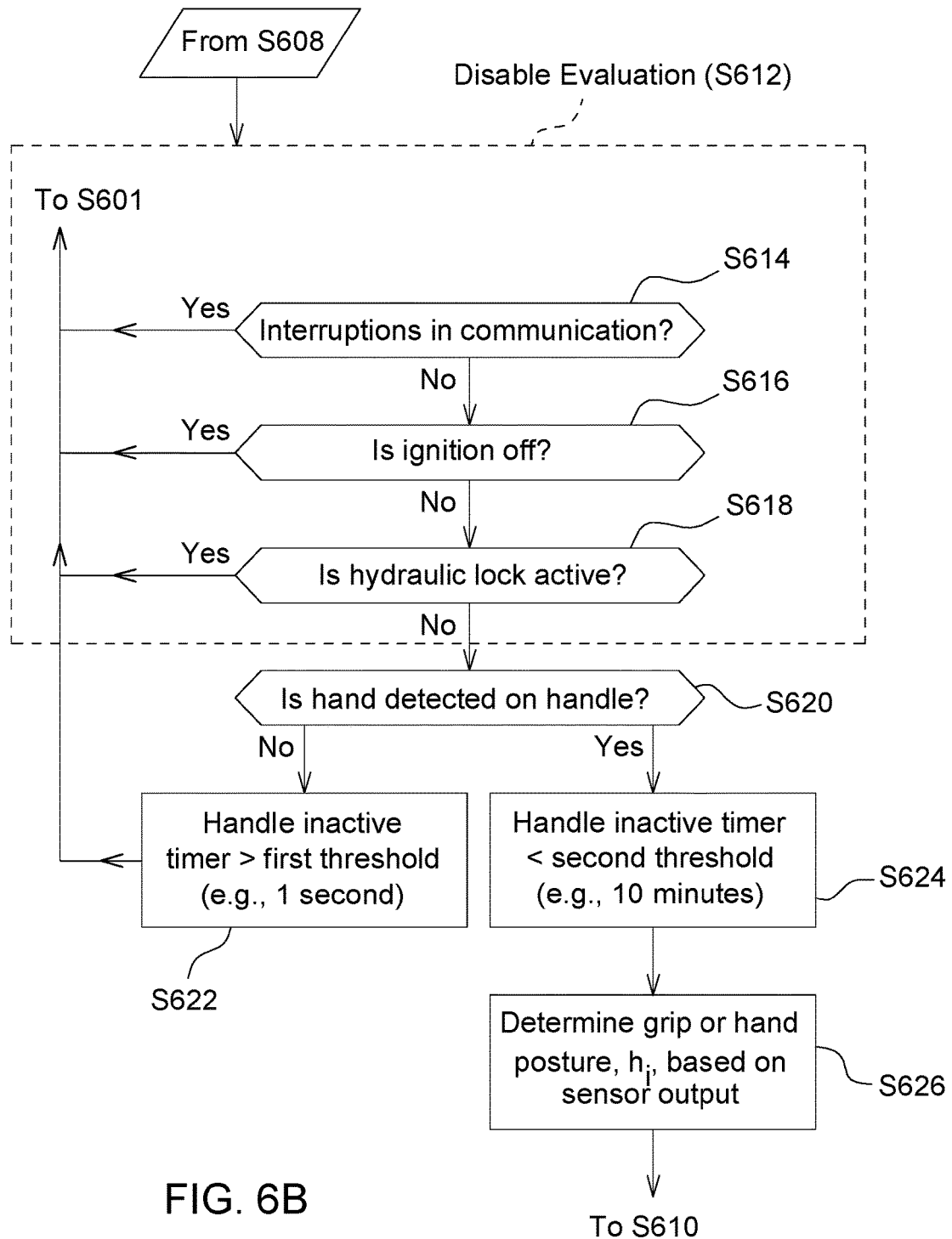

FIG. 6 is a flow chart of method with a hand sensor 12 for sensing hand or finger positions that are used to control a vehicle. The method of FIG. 6 begins in step S600.

In step S600, the vehicle is started up or the vehicle electronics is activated. For example, the ignition switch 54 of the vehicle is in an on-state.

In step S601, during and after the vehicle is started up, the actuator 38 control or hydraulic control is disabled for one or more time intervals based on the disable evaluation process of block S612.

In block S612, a data processor 24 or data processor 24 determines whether or not communications on the vehicle data bus 50 is interrupted or unavailable in step S614, whether or not the ignition switch 54 of the vehicle is off in step S616, and whether or not the hydraulic lock is active in step S618. In step S614, if the communication on the vehicle data bus 50 or to the hand sensor 12 is interrupted, the method continues with step 601 in which the hydraulic control is disabled. In step S616, if the ignition switch 54 is off in step S616, the method continues with step S601 in which the hydraulic control is disabled. In step S618, if the hydraulic lock is active, the method continues with step S601 in which the hydraulic control is disabled. However, if the communication on the vehicle data bus 50 or to the hand sensor 12 is not interrupted in step S614, if the ignition switch 54 is not off in step S616, and if the hydraulic lock is not active in step S618, the method continues with step S620. The hydraulic lock may refer to a state in which the user disables the hydraulic system, such as through an entry in the user interface 20 or input to position of the handle.

In one embodiment, step S602 may follow step S601.

In step S602, following a first interval or another interval, a hand sensor 12, a handle, or one or more capacitive sensors 14 may determine whether a hand or a portion of a hand (e.g., one or more fingers) is detected on the handle. If the hand sensor 12 or data processing system 22 determines that the hand or hand portion is not detected, then the method returns to step S601. However, if the hand sensor 12 or data processing system 22 determines that the hand or hand portion is detected, then the method continues with step S603.

In step S603, the electronic data processing system 22 or data processor 24 determines a hand posture or identified grip based on sensor output or observed touch-point data for one or more capacitive sensors 14 that matches or is substantially similar to reference touch-point data stored in the data storage device 30. For example, the reference touch point data is stored as a look-up table 32 or other data structure. The reference touch point data defines a constellation of contact points of the hand portion or fingers on respective capacitive sensors 14 with capacitive sensor 14 identifiers, where each capacitive sensor 14 is associated with a different or unique region of the handle. A grip or identified grip may be defined by the orientation of one or more fingers, the palm or other parts of the hand with respect to the handle and one or more capacitive sensors 14 associated with the handle. Similarly, posture may be defined by the orientation of one or more fingers, the palm or other parts of the hand with respect to the handle and one or more capacitive sensors 14 associated with the handle, where a grip or posture may be rated in conformity to a strength, weakness, openness, closeness, angular orientation, compressive force, or other characteristic of grip with respect to a standard grip or reference grip.

Each grip or posture is defined by grip data, which refers to corresponding touch points or a constellation (e.g., three dimensional spatial representation) of touched capacitive sensors 14. In certain embodiments, a look-up table 32 or other data storage device 30 may store grip data for a number (e.g., typically two to six) of unique grips. Each grip may be associated with a unique identifier, name, or style. For example, grip identifiers may include the following, among others: "full hand grip" or "fingertip top grip." The output of step S603 may be used in step S610 and step S604 and/or step S610 can follow step S603.

In step S604, the handle displacement sensor 18 determines whether the handle is centered, in a rest position, or in neutral state. In one embodiment, the handle displacement sensor 18 may comprise a joystick sensor that is capable of providing a joystick position code indicative that the handle is centered, in a rest position, or in a neutral state. If the handle displacement sensor 18 determines that the handle is centered, in a rest position or in a neutral state, the method continues with step S608. However, if the handle displacement sensor 18 determines that the handle is not centered, not in a rest position or not in a neutral state, the method continues with step S606.

In step S608, the hydraulic flow or actuator 38 is available immediately.

In step S606, the data processing system 22 supports the increase of hydraulic flow based on an operator-commanded flow during an initialization time period (e.g., 2 seconds), where the operator-commanded flow is derived from the detected position or movement of the handle by the operator via the handle displacement sensor 18. In some embodiments, the increase in hydraulic flow can be canceled by centering or re-centering the handle (e.g., joystick) after the increase has begun during the initialization time period. Further, the handle may have a deactivated position or detent position where there is no response or activation of the initialization period.

After step S608 or step S606, in step S609, the data processing system 22 enables hydraulic control of an vehicle, implement, system or component of the vehicle based on gain or control response ratio (or a corresponding hydraulic fluid flow rate) determined by the reference touchpoint map for a respective hand grip or respective posture, consistent with step S610, step S608 or step S606.

In step S610, the data processing system 22 determines electrical gain for the output of the handle displacement sensor 18 based on the identified grip, grip identifier or posture (e.g., from step S603). The electrical gain is applied to an actuator 38 or the electrical gain is converted to hydraulic gain or control response ratio (e.g. hydraulic fluid flow rate, volume, and/or pressure) applied by a hydraulic pump or an electrohydraulic valve. For example, if a first grip (950, 951) (e.g., first grip identifier or full hand grip) is detected, the electrical gain (e.g., adjusted or revised gain) of the handle displacement sensor 18 is set to a high level or the data processing system 22 provides an electrical signal to the actuator 38, electrohydraulic valve or electrohydraulic pump to achieve full hydraulic flow to one or more hydraulic circuits or cylinders on a vehicle or associated implement. For instance, the high gain level (e.g., coarse control) is well-suited for quick or forceful operation of implements, vehicle systems, or vehicle components. However, if a second grip (953,954) (e.g., second grip identifier or fingertip top grip) is detected, the electrical gain (e.g., adjusted or revised gain) of the handle displacement sensor 18 is set to a low level or the data processing system 22 provides an electrical signal to the actuator 38, electrohydraulic valve, electrically controlled hydraulic pump, or electrohydraulic pump to achieve low hydraulic flow. The low gain level (e.g., fine control) is well-suited for precise operation of implements, vehicle systems or vehicle components.

In step S620, which may follow block S612 if certain conditions are satisfied, a data processor 24, a hand sensor 12, a handle, or one or more capacitive sensors 14 may determine whether a hand or a portion of a hand is detected on the handle for a first threshold period or a second threshold period. If the hand sensor 12 or data processing system 22 determines that the hand or hand portion is not detected for time period that is equal to or greater than a first threshold period (e.g., approximately 1 second), then the method returns to step S622. However, if the hand sensor 12 or data processing system 22 determines that the hand or hand portion is not detected for a second threshold period that is less than a second threshold (e.g., approximately 10 minutes), then the method continues with step S624.

In step S622, the data processor 24 or timer 36 determines that the handle is inactive for a time period that meets or exceeds a first threshold (e.g., approximately 1 second or greater than or equal to 1 second). After step S622, the method returns to step S601 to disable the hydraulic control.

In step S624, the data processor 24 or timer 36 determines that the handle is inactive for a time period that is less than a second threshold (e.g., approximately 10 minutes).

After step S624 in step S626, the data processing system 22 determines a hand grip or hand posture based on sensor output. After step S626, the method continues with step S610.

FIG. 7 shows a cross-section of one embodiment of an illustrative capacitive sensor 14 that can be used for the hand sensor 12 for sensing hand or finger positions. In one embodiment, the capacitive sensor 14 comprises a first electrode 704 and a second electrode 702 that are separated by an intermediate dielectric layer 703. As illustrated in FIG. 7, the first electrode 704 and the second electrode 702 each may comprise an electrically conductive grid of rows or columns. Although the rows of the first electrode 704 are connected to a common terminal 709 and the columns of the second electrode 702 are connected to a common terminal 707, in alternate embodiments, each row of the first electrode 704 could be associated with a corresponding first terminal and each column of the second electrode 702 could be associated with a corresponding second terminal to provide an exact location or higher resolution position of where a finger, hand portion, overlies or contacts the capacitive sensor 14.

In another alternate embodiment, the first electrode 704, the second electrode 702 or both could comprise a substantially planar conductive layer or sheet with any geometric shape or perimeter, such as a polygon, ellipse or otherwise. However, if both the first electrode 704 and the second electrode 702 are continuous conductive layers or sheets, such as conductive rectangular sheet, the exact contact position on the electrode cannot be detected.

The first electrode 704 and the second electrode 702 are composed of a metal (e.g., copper), a metal alloy, or the like. The first electrode 704 can be bonded to wire or conductor 710. Similarly, the second electrode 702 can be bonded to a wire or conductor 708. In some embodiments, the first electrode 704 is embedded in a first dielectric protective layer 706 and the second electrode 702 is embedded in a second dielectric protective layer 701.

In one embodiment, the first dielectric protective layer 706, the second dielectric protective layer 701 and the intermediate dielectric layer 703 may be composed of polymers, plastics, elastomers, fiber filled polymers, fiber filled plastics, or other composite materials. In one embodiment, the first dielectric protective layer 706, the second dielectric protective layer 701, and the intermediate layer 703 are formed of flexible circuit board materials, such as polyimide with conductive traces (e.g., copper, metal or metal alloy conductive traces).

During operation of the hand sensor 12, each capacitive sensor 14 is charged with a voltage potential between the terminals associated with the first electrode 704 and the second electrode 702. If a finger or hand, or portion thereof, overlies or contacts the first electrode 704 or the second electrode 702, the capacitive sensor 14 changes its capacitance, which can be detected by detector 16.

In one embodiment, the detector 16 comprises an oscillator and a measurement circuit, where the oscillator uses the capacitive sensor 14 as part of a tuned circuit that establishes a frequency of oscillation of the oscillator. The measurement circuit can identify a change in the frequency of oscillation as a corresponding change in capacitance of the capacitive sensor 14, for example.

FIG. 8 is an exploded perspective view of one embodiment of an illustrative capacitive sensor 14. Although capacitive sensors 14 are referenced in FIG. 7 and FIG. 8 as illustrative examples, in alternative embodiments, one or more resistive sensors can be used, alone or together with one or more capacitive sensors 14. For example, the capacitive sensor 14 can be replaced by a piezoresistive sensor that changes its electrical resistance in response to the application of force by one or more fingers, a hand, or a hand portion. Similarly, the capacitive sensor 14 can be replaced by a piezoelectric sensor or another tactile sensor that changes its electrical characteristic in response to the application of force by one or more fingers, a hand, or a hand portion. If resistive sensors or piezoresistive sensors are used, the detector 16 is adapted to detect change in resistance of the piezoresistive circuit by measuring a change in voltage or current associated with a resistive dividing circuit (e.g., Wheatstone bridge).

FIG. 9A and FIG. 9B show the illustrative placement or constellation of one or more capacitive sensors 14 on one possible handle configuration. The capacitor sensors are shown as dashed lines because they may be at or below the exterior surface of the handle. For instance, the capacitive sensors 14 may be embedded below a dielectric outer layer or skin of the handle.

In FIG. 9A, which shows one view or side of the handle, a first sensor 901 and a fourth sensor 904 are entirely visible, where the fifth sensor 905 and the eighth sensor 908 are at least partially visible. In FIG. 9B, which shows an opposite view or opposite side of the handle from FIG. 9A, a sixth sensor 906 is entirely visible, while a second sensor 902, a third sensor 903, a fifth sensor 905 and a seventh sensor 907 are partially visible. Any of the sensors illustrated in FIG. 9A and FIG. 9B may represent the tactile or capacitive sensors 14 illustrated in FIG. 1, FIG. 7 and FIG. 8, or resistive sensors (e.g., piezoresistive sensors). The positions and orientations of the sensors on the handle are selected to form a constellation or three dimensional representation of which touch points of the hand or fingers can indicate a particular grip by a user.

Each sensor is associated with a unique sensor identifier. The look-up table 32 or the data structure stores each sensor identifier of each touch points that is contacted along with a corresponding grip identifier for the set of sensor identifiers or touch points that are contacted simultaneously or substantially simultaneously within a circuit time window (e.g., a maximum time between the first contacted sensor and the last contacted sensor on the handle). The look-up table 32 or data structure can be specific to the positions and orientations of the sensors on the handle. For example, the look-up table 32 or data structure is matched or paired with a suitable handle configuration with known and corresponding positions and/or orientations of the sensors (e.g., contacted sensors) to define accurately the grip identifiers that apply. Further, the sensors can be calibrated with various grip types if the user's hand differs in size from an average, mean, median, or medium sized hand.

Figure 10B:
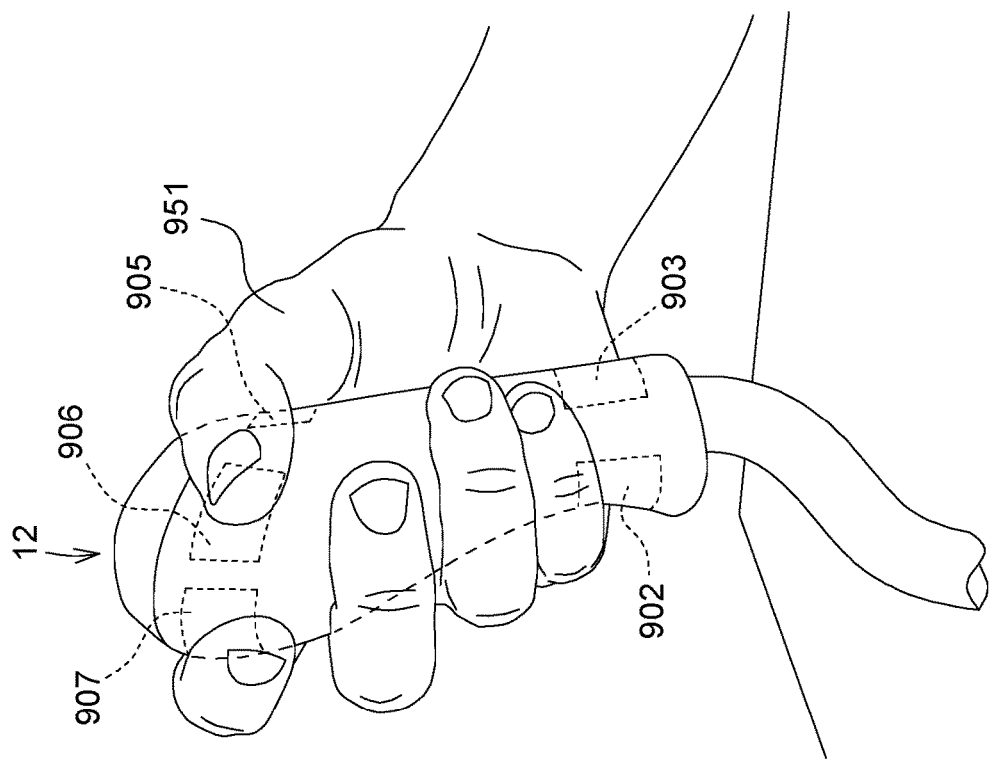
FIG. 10B is a perspective view of the first grip from an opposite side to that of FIG. 10A.
Figure 10A:
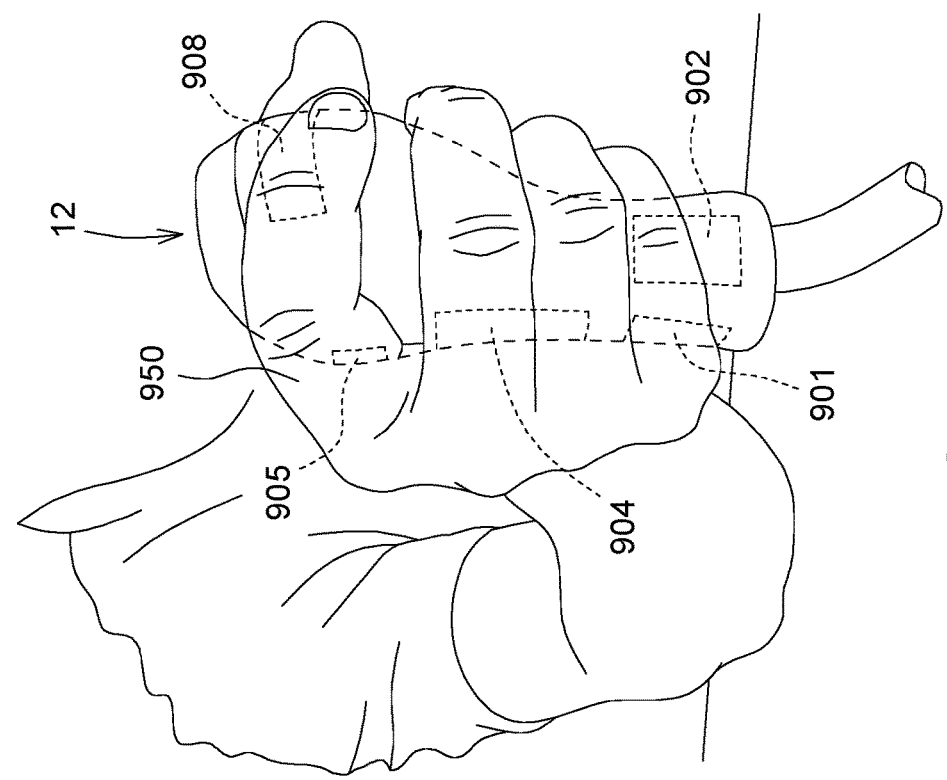
FIG. 10A is a perspective view of a first grip of the handle from one side.

FIG. 10A is a perspective view of a first grip (950, 951) of the handle from one side. FIG. 10B is a perspective view of the first grip (950, 951) from an opposite side to that of FIG. 10A. FIG. 10A and FIG. 10B collectively illustrate a full hand grip or a hand grip with a closed fist.

FIG. 14 provides the corresponding grip data map or reference touch-point map, which can be stored as a look-up table 32 in the data storage device 30, for the first grip (950, 951) or full hand grip with a closed first of FIG. 10A and FIG. 10B. The reference touch-point map can be stored in the data storage device 30 for later reference by the data processor 24 to identify a particular grip, or a gain or control response ratio that applies to the particular grip of the operator on the handle. For example, the grid map data or reference touch-point map provides that the hand is in contact with the first sensor 901, the second sensor 902, the fourth sensor 904, the fifth sensor 905, the sixth sensor 906, the seventh sensor 907 and the eighth sensor 908, whereas the third sensor 903 has a no contact state or don't-care state. If the third sensor 903 is contacted by the hand, this could indicate that the user has a larger than average, mean or median hand; such contact with the third sensor 903 could be evaluated during a calibration process that the user undertakes to calibrate the handle and user interface 20 from time-to-time prior to the user's first use of the vehicle.

In one embodiment, the first grip (950, 951) or a full hand grip, with a closed fist, is associated with a first gain or a first control response ratio (C/R) to be applied to an actuator 38. The first gain or first C/R may be stored in conjunction with the look-up table 32, grip data map, or the reference touch-point map, or separately from the look-up table 32, grip data map, or reference touch-point map, such as FIG. 14. For example, the first gain may represent a first gain setting of an initial electrical signal of the hand sensor 12 or a first gain adjustment of the initial electrical signal to yield a revised electrical signal.

The first gain and first control response have an inverse relationship such that an increase in gain is associated with a corresponding decrease in control response ratio, and vice versa. In one configuration, a first gain for the first grip (950, 951) or full hand grip is greater than any gain for the third grip (955, 956) (e.g., open hand grip) the fourth grip (957, 958) (e.g., finger grip with top handling). Equivalently, a first control response ratio (C/R) for the first grip (950, 951) or full hand grip is lower than any C/R for the third grip (955, 956) (e.g., open hand grip) the fourth grip (957, 958) (e.g., finger grip with top handling).

In another configuration, the first gain for the first grip (950, 951) or full hand grip is greater than any gain for the second grip (953,954) (e.g., lower full hand grip with closed fist), the third grip (955, 956) (e.g., open hand grip) the fourth grip (957, 958) (e.g., finger grip with top handling). Equivalently, a first C/R for the first grip (950, 951) or full hand grip is lower than any C/R for the second grip (953,954) (e.g., lower full hand grip with closed fist), the third grip (955, 956) (e.g., open hand grip) the fourth grip (957, 958) (e.g., finger grip with top handling)

In yet another configuration, the first gain for the first grip (950, 951) or full hand grip is greater than any gain for the second grip (953,954) (e.g., lower full hand grip with closed fist). Similarly, the first C/R for the first grip (950, 951) or full hand grip is less than any gain for the second grip (953,954) (e.g., lower full hand grip with closed fist). Accordingly, the greater gain or lesser C/R associated with the first grip (950, 951) than other grips can support quick, responsive and/or aggressive movement of the actuator 38, or implements, systems or vehicles controlled by the actuator 38. For example, the greater gain or lesser C/R may be used for tasks that require speed, as opposed to precision, such as a backhoe or loader loading trucks with material.

Figure 11B:
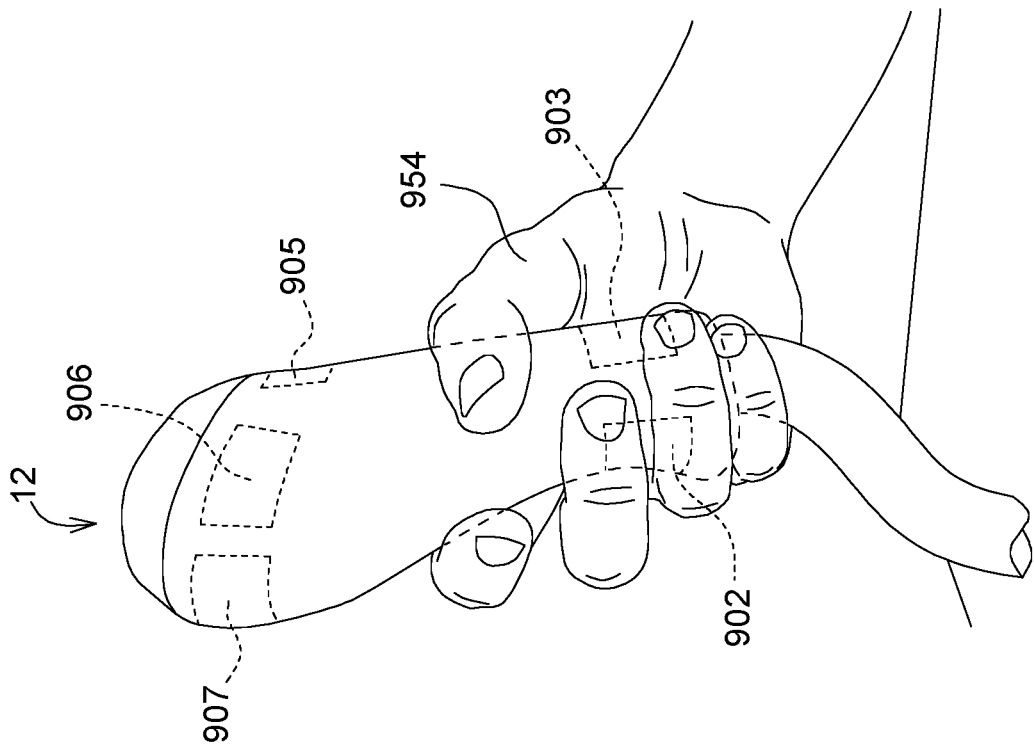
FIG. 11B is a perspective view of the second grip from an opposite side to that of FIG. 11A.
Figure 11A:
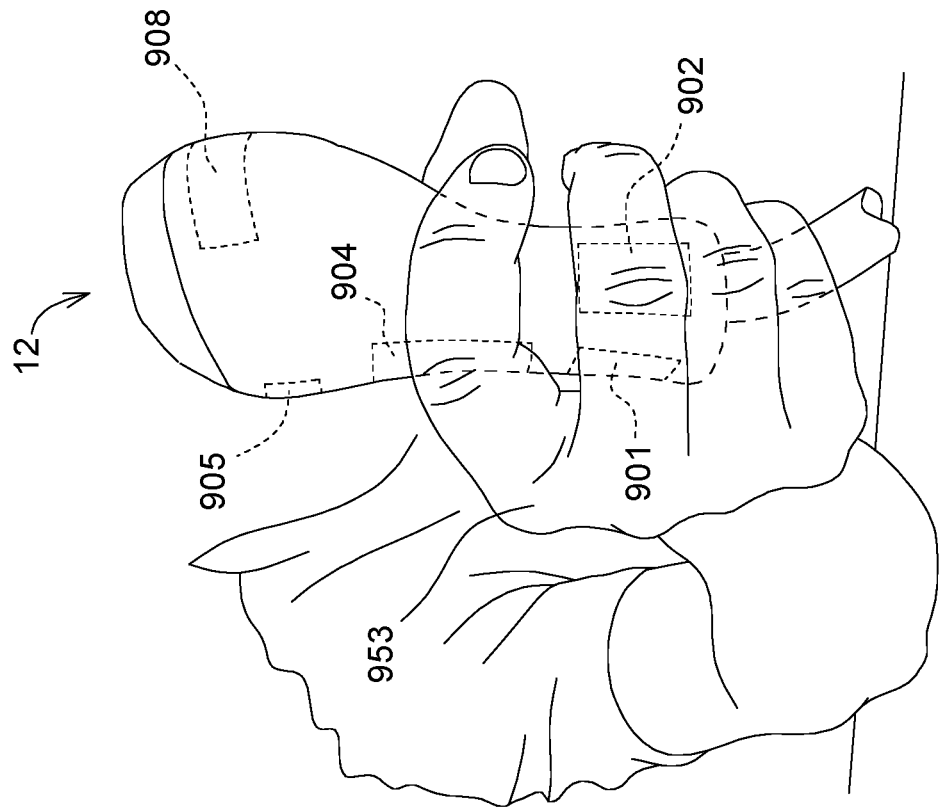
FIG. 11A is a perspective view of a second grip of the handle from one side.

FIG. 11A is a perspective view of a second grip (953,954) of the handle from one side. FIG. 11B is a perspective view of the second grip (953,954) from an opposite side to that of FIG. 11A. FIG. 11A and FIG. 11B collectively illustrate a lower full hand grip or a lower hand grip with a closed fist.

FIG. 15 provides the corresponding grip data map or reference touch-point map, which can be stored as a look-up table 32 in the data storage device 30, for the second grip (953,954) or lower full hand grip with a closed first of FIG. 11A and FIG. 11B. The reference touch-point map can be stored in the data storage device 30 for later reference by the data processor 24 to identify a particular grip, or a gain or control response ratio that applies to the particular grip of the operator on the handle. For example, reference touch-point map or the grid map data provides that the hand is in a contact-state with the first sensor 901, the second sensor 902, the third sensor 903, and the fourth sensor 904, whereas the hand is not in a contact state with the fifth sensor 905, the sixth sensor 906, the seventh sensor 907 or the eighth sensor 908, during a sampling period.

In one embodiment, the second grip (953,954) or a lower full hand grip, with a closed fist, is associated with a second gain or second control response ratio (C/R) to be applied to an actuator 38. The second gain or second C/R may be stored in conjunction with the look-up table 32, grip data map, or the reference touch-point map, or separately from the look-up table 32, grip data map, or reference touch-point map, such as FIG. 15.

In one configuration, a second gain or second control response ratio (C/R) for the second grip (953,954) or lower full hand grip, with a closed fist, is approximately equal to the first gain of full hand grip, with a closed fist. In one configuration, a second gain for the second grip (953,954) or the lower full hand grip, with closed fist, is greater than any gain for the third grip (955, 956) (e.g., open hand grip) and the fourth grip (957, 958) (e.g., finger grip with top handling). Accordingly, the greater gain associated with the second grip (953,954) than other grips can support quick, responsive and/or aggressive movement (e.g., coarse control) of the actuator 38, or implements, electronic devices, systems or vehicles controlled by the actuator 38.

Conversely, the second control response ratio for the second grip (953,954) or the lower full hand grip, with closed fist, is less than any gain for the third grip (955, 956) (e.g., open hand grip) and the fourth grip (957, 958) (e.g., finger grip with top handling). Accordingly, the lesser second control response ratio associated with the second grip (953,954) than other grips can support quick, responsive and/or aggressive movement (e.g., coarse control) of the actuator 38, or implements, electronic devices, systems or vehicles controlled by the actuator 38.

Figure 12B:
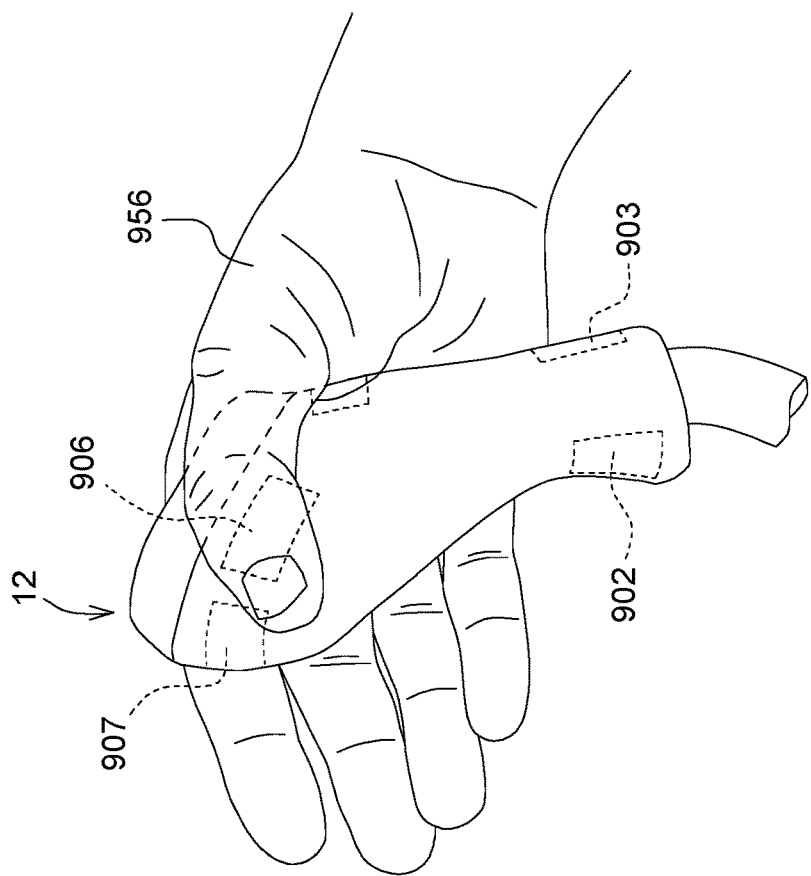
FIG. 12B is a perspective view of the third grip from an opposite side to that of FIG. 12A.
Figure 12A:
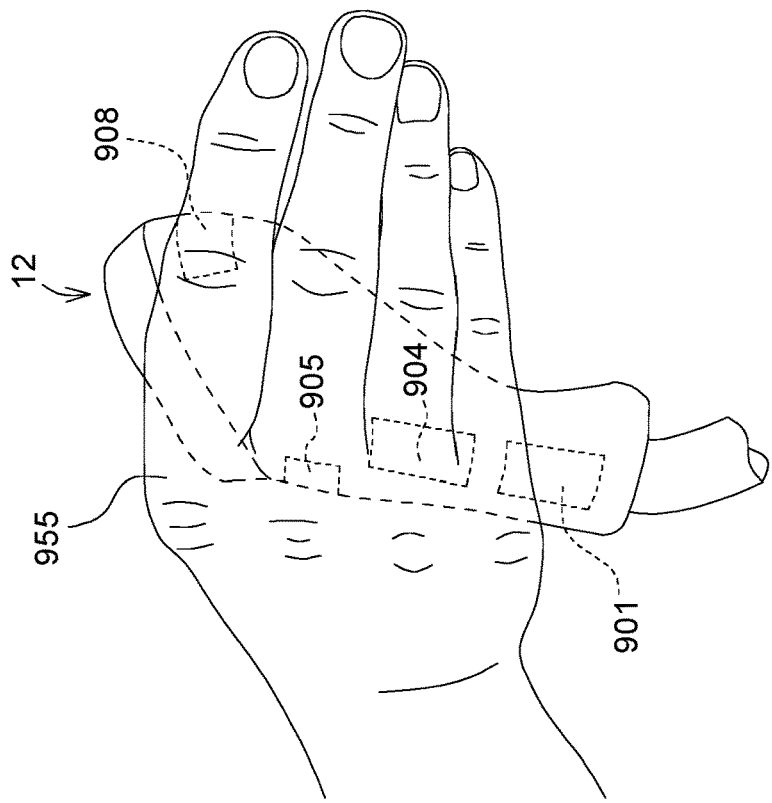
FIG. 12A is a perspective view of a third grip of the handle from one side.

FIG. 12A is a perspective view of a third grip (955, 956) of the handle from one side. FIG. 12B is a perspective view of the third grip (955, 956) from an opposite side to that of FIG. 12A. FIG. 12A and FIG. 12B collectively illustrate an open hand grip.

FIG. 16 provides the corresponding grip data map or reference touch-point map, which can be stored as a look-up table 32 in the data storage device 30, for the third grip (955, 956) or open hand grip of FIG. 12A and FIG. 12B. The reference touch-point map can be stored in the data storage device 30 for later reference by the data processor 24 to identify a particular grip, or a gain or control response ratio that applies to the particular grip of the operator on the handle. For example, the grip data map or data-point map provides that the hand is in a contact state with the fourth sensor 904 the fifth sensor 905 and the sixth sensor 906, whereas the hand is not in a contact state with the second sensor 902, the third sensor 903 or the seventh sensor 907. Further, according to the grip data map or data-point map, the first sensor 901 and eight sensor are in contact with the hand or have a don't-care state that can be in contact or out of contact with the user's hand.

In one embodiment, the third grip (955, 956) or open hand grip is associated with a third gain or third control response ratio (third C/R) to be applied to an actuator 38. The third gain or third C/R may be stored in conjunction with the look-up table 32, grip data map, or the reference touch-point map, or separately from the look-up table 32, grip data map, or reference touch-point map, such as FIG. 16. In one configuration, a third gain or third C/R for the third grip (955, 956) or open hand grip is approximately equal to the fourth gain or fourth C/R for the fourth grip (957, 958) or finger grip with top handing. In another configuration, a third gain for the third grip (955, 956) or open hand grip is less than the first gain of the first grip (950, 951) or full hand grip, with closed first and is less than the second gain of the second grip (953,954) or lower full hand grip. Accordingly, the lesser gain is associated with the third grip (955, 956) than other grips can support precise, gentle or subtle movement (e.g., fine control) of the actuator 38, or implements, electronic devices, systems or vehicles controlled by the actuator 38.

Conversely, a third C/R for the third grip (955, 956) or open hand grip is greater than the first C/R of the first grip (950, 951) or full hand grip, with closed first and is greater than the second C/R of the second grip (953,954) or lower full hand grip. Accordingly, the greater C/R is associated with the third grip (955, 956) than other grips can support precise, gentle or subtle movement (e.g., fine control) of the actuator 38, or implements, electronic devices, systems or vehicles controlled by the actuator 38.

Figure 13B:
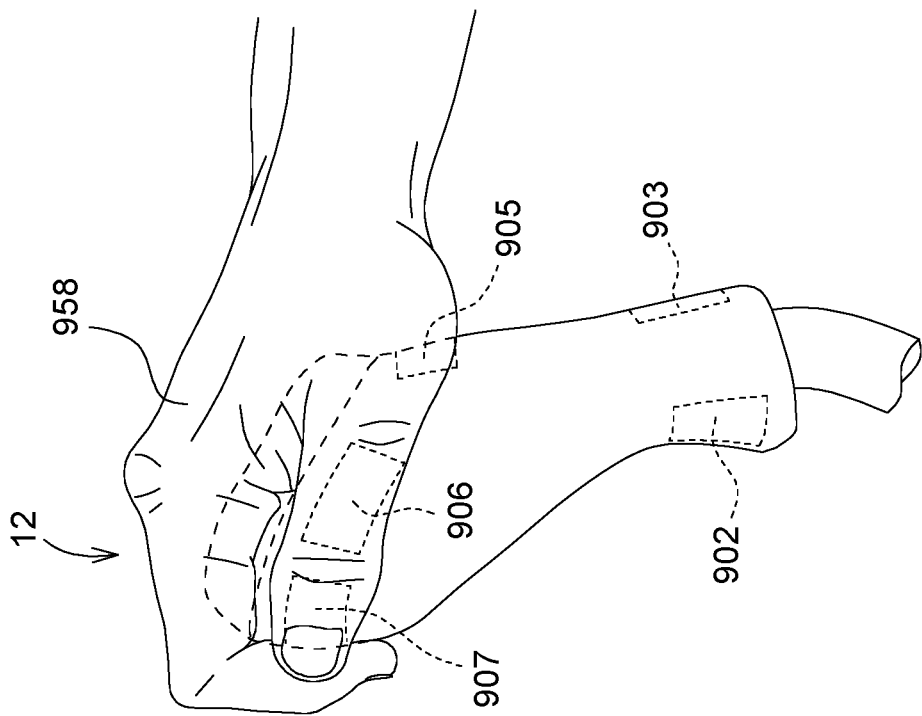
FIG. 13B is a perspective view of the fourth grip from an opposite side to that of FIG. 13A.
Figure 13A:
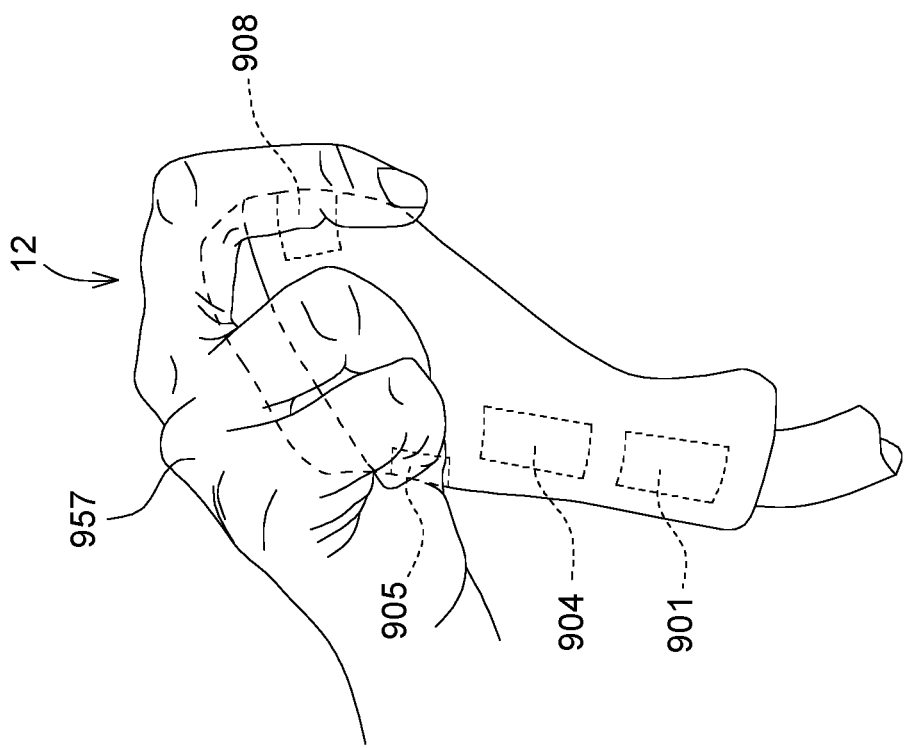
FIG. 13A is a perspective view of a fourth grip of the handle from one side.

FIG. 13A is a perspective view of a fourth grip (957, 958) of the handle from one side. FIG. 13B is a perspective view of the fourth grip (957, 958) from an opposite side to that of FIG. 13A. FIG. 13A and FIG. 13B collectively illustrate a finger grip with top handling. In one embodiment, the fourth grip (957, 958) or finger grip with top handling is associated with a fourth gain or fourth C/R to be applied to an actuator 38.

FIG. 17 provides the corresponding grip data map or reference touch-point map for the fourth grip (957, 958) or finger grip with top handling, which can be stored as a look-up table 32 in the data storage device 30, for the fourth grip (957, 958) or finger grip with top handling of FIG. 13A and FIG. 13B.

The fourth gain or fourth C/R may be stored in conjunction with the look-up table 32, grip data map, or the reference touch-point map, or separately from the look-up table 32, grip data map, or reference touch-point map, such as FIG. 17. In one configuration, a fourth gain or fourth C/R for the fourth grip (957, 958) or the finger grip with top handling is approximately equal to the third gain or third C/R, respectively, for the third grip (955, 956) or open grip with top handling. In another configuration, a fourth gain for the fourth grip (957, 958) or the finger grip with top handling is less than the first gain of the first grip (950, 951) or full hand grip, with closed fist, and is less than the second gain of the second grip (953,954) or lower full hand grip. Accordingly, the lesser gain associated with the fourth grip (957, 958) than other grips can support precise, gentle or subtle movement of the actuator 38, or implements, systems or vehicles controlled by the actuator 38.

Conversely, a fourth C/R for the fourth grip (957, 958) or the finger grip with top handling is greater than the first C/R of the first grip (950, 951) or full hand grip, with closed first and is greater than the second C/R of the second grip (953,954) or lower full hand grip. Accordingly, the greater C/R is associated with the fourth grip (957, 958) than other grips can support precise, gentle or subtle movement of the actuator 38, or implements, systems or vehicles controlled by the actuator 38.

In FIG. 14 through FIG. 17, inclusive, represent possible charts, look-up table 32s, files or data structures associated with sensors and contact points on a handle, which can define a corresponding illustrative grip. As illustrated in FIG. 14 through FIG. 17, each grip is defined by the touch status of up to eight respective sensors, which are designated from a first sensor 901 to an eighth sensor 908. However, in the more general case, any number of sensors N can be used where N is a positive whole number or positive integer greater than three.

Each sensor can be defined a sensor identifier that is indicative of a spatial orientation or relative position of a surface area associated with the sensor on the handle. In some configurations, each sensor can have an approximately equal surface area and equivalent shape. However, in other configurations, the sensor surface area and shape can vary based on the spatial orientation or position on the handle. In some configurations, the sensor surface area for one or more sensors on the handle can be customized in accordance with operator preferences or operator hand size. For example, the sensor surface area for one or more sensors on the handle can be reduced for operators with larger-than-average hands and increased for operators with smaller-than-average hands, where larger-than-average hands and smaller-than-average hands may be determined by statistical data on operators or persons in a sample geographic area relative to average size, which represents a mode, median, and mean of the statistical data.

In FIG. 14 through FIG. 17, inclusive, each chart or lookup table has a corresponding reference touch point datum that indicate whether or not a hand or portion of a hand (one or more fingers) contact or touch a corresponding sensor identifier. For example, the reference touch-point map of FIG. 14 for a corresponding identified grip, such as the full grip with closed hand of FIG. 10A and FIG. 10B, includes hand contact at the first sensor 901, the second sensor 902, the fourth sensor 904, the fifth sensor 905, the sixth sensor 906, the seventh sensor 907 and the eight sensor, whereas the third sensor 903 has a don't care state or a no contact with the hand or fingers of the operator.

In an alternate embodiment, each touch-point map or grip data for any particular grip in FIG. 14 through FIG. 17, inclusive, may be augmented or appended by an additional field of a corresponding gain or control response ratio, such as a gain setting, gain adjustment, control response setting, or control response adjustment. Each particular grip can be associated with a respective gain or respective control response.

In one configuration, the gain or control response ratio associated with each particular grip has a value or setting that depends upon the operating signal range or other specifications of the actuator 38 that is controlled by the gain or response ratio, the work task that will be performed with an accompanying gain or control response ratio, and any other relevant characteristics of the control system for the implement and the vehicle, for instance.

In some embodiments, the gain or control response may be varied, programmed or adjusted based on user-definable preferences, factory equipment settings, or historic operation of certain operators.

FIG. 15 is another possible chart or look-up table 32 associated with sensors (e.g., sensor identifiers) and sensor contact status (e.g., hand contact status) on a handle, which can define a corresponding illustrative grip, such as a lower full hand grip or a lower hand grip with a closed first of FIG. 11A and FIG. 11B.

FIG. 16 is yet another possible chart or look-up table 32 associated with sensors (e.g., sensor identifiers) and contact status (e.g., hand contact status) on a handle, which can define a corresponding illustrative grip, such as the open hand grip of FIG. 12A and FIG. 12B.

FIG. 17 is still another possible chart or look-up table 32 associated with sensors (e.g., sensor identifiers) and contact status (e.g., hand contact status) on a handle, which can define a corresponding illustrative grip, such as the finger grip with top handling of FIG. 12A and FIG. 12B.

The system and method described in this document is well-suited for ergonomically, automating gain or C/R control of joystick in real time consistent with different operator grip types in heavy-equipment or other vehicles to reduce operator fatigue, enhance operator comfort, and increase operator efficiency. For example, the system and method is well suited for seamlessly, dynamically adjusting gain or C/R based on detection of the operator's grip of the handle of the joystick for each sampling interval during operation of the vehicle, where the adjusted gain can be targeted for fine control or coarse control of an implement or tool controlled by an actuator.

Having described the preferred embodiment, it will become apparent that various modifications can be made without departing from the scope of the invention as defined in the accompanying claims.

The following is claimed:

1. A device for converting hand or finger positions or movements into electrical signals, the device comprising:
   a handle for receiving one or more fingers or a portion of a hand;
   a handle displacement sensor for producing an electrical signal in response to movement or displacement of the handle;
   a set of tactile sensors on or near the surface of the handle, each tactile sensor associated with a different region of the handle;
   a detector for detecting contact of one or more of the tactile sensors to generate an observed touch-point map for the handle for a respective sampling interval;
   an electronic data processor for generating a gain or control response ratio in the electrical signal outputted by the device in response to the observed touch-point map matching or being substantially similar to a reference touch-point map among a plurality of reference touch-point maps, and
   an electrohydraulic valve is controlled based on the gain or the control response ratio to increase hydraulic flow to a first flow level that is higher than a second flow level if the data processor identifies a hand grip of the handle as an applicable gesture for the sampling interval that is associated with coarse control of an implement controlled by the electrohydraulic valve;
   wherein each reference touch-point map is associated with a respective gain or respective control response ratio that is stored in a data storage device, the control response ratio adjusting the sensitivity of the electrical signal to movement or displacement of the handle.

2. The device according to claim 1 wherein the reference touch point map is stored in the data storage device along with a plurality of other reference touch-point maps and wherein the data processer searches candidate reference touch-point maps in the data storage device for the reference touch point map that matches or is substantially similar to the observed touch-point map.

3. The device according to claim 1 wherein the reference touch-point map is associated with a grip type of one or more fingers or a portion of the hand on the handle, and wherein the grip type is selected from the group comprising one or more of the following:
   a hand grip, a finger grip, a full grip, a base grip, an open palm grip, a fingertip grip, a hand grip with closed fist, a hand grip with open hand, a finger grip with side handling, and a finger grip with top handling.

4. The device according to claim 1 wherein a grip comprises one or more fingers or a portion of the hand on the handle, and wherein the grip is identified if the observed touch point map sufficiently matches, corresponds or correlates to the reference touch-point map based on meeting or exceeding certain threshold percentage match for the observed touch-point map and the reference touch point map for the identified grip.

5. The device according to claim 4 where each don't-care state is associated with a contact or no contact of a respective tactile sensor and where each don't care state for a reference touch-point map is excluded from determination of the threshold percentage.

6. The device according to claim 1 wherein the handle comprises a joy stick that produces the electrical signal based on movement or displacement of the handle with respect to the a reference coordinate system.

7. The device according to claim 6 wherein the reference coordinate system comprises coordinates in the X-Y plane of a Cartesian coordinate system.

8. The device according to claim 1 further comprising:
   an actuator controlled based on the gain or the control response ratio if the electronic data processor identifies a respective hand grip of the handle as an applicable gesture for the sampling interval.

9. The device according to claim 1 further comprising:
   the electrohydraulic valve is controlled based on the gain or the control response ratio to decrease hydraulic flow to a second flow level that is lower than a first flow level if the electronic data processor identifies a finger grip of the handle as an applicable gesture for the sampling interval that is associated with fine control of an implement controlled by the electrohydraulic valve.

10. The device according to claim 1 further comprising:
    a timer associated with the data processor to determine if the handle is not contacted by a user's hand or fingers for a minimum threshold period;
    a user interface coupled to the data processor; and
    the data processor generating an alert to the user interface if the handle is not contacted by a user's hand or fingers for a minimum threshold period.

11. The device according to claim 1 wherein the set of tactile sensors comprises a set of capacitive sensors.

12. A method for converting hand or finger positions or movements into electrical signals, the method comprising:
    receiving one or more fingers or a portion of the hand on a handle;
    producing an electrical signal in response to movement or displacement of the handle;
    providing a set of tactile sensors on or near the surface of the handle, each sensor associated with a different region of the handle; detecting contact of one or more of the tactile sensors to generate an observed touch-point map for the handle for a respective sampling interval;
    determining a gain or control response ratio in the electrical signal outputted by the method in response to the observed touch-point map matching or being substantially similar to a reference touch-point map among a plurality of reference touch-point maps, and
    controlling an electrohydraulic valve based on the gain to increase hydraulic flow to a first flow level that is higher than a second flow level if the controller identifies a hand grip of the handle as an applicable gesture for the sampling interval that is associated with coarse control of an implement controlled by the electrohydraulic valve,
    wherein each reference touch-point map is associated with a respective gain or respective control response ratio that is stored in a data storage device, the control response ratio adjusting the sensitivity of the electrical signal to movement or displacement of the handle.

13. The method according to claim 12 further comprising:
    storing the reference touch-point map in the data storage device along with a plurality of other reference touch-point maps; and
    searching candidate reference touch-point maps in the data storage device for the reference touch point map that matches or is substantially similar to the observed touch-point map.

14. The method according to claim 12 further comprising:
associating the reference touch-point map with a grip type selected from a group comprising one or more of the following:
a hand grip, a finger grip, a full grip, a base grip, an open palm grip, a fingertip grip, a hand grip with closed fist, a hand grip with open hand, a finger grip with side handling, and a finger grip with top handling.

15. The method according to claim 12 further comprising:
identifying a user's grip of the handle if the observed touch point map sufficiently matches, corresponds or correlates to the reference touch-point map based on meeting or exceeding certain threshold percentage match for the observed touch-point map and the reference touch point map for an identified grip.

16. The method according to claim 15 further comprising:
excluding each don't-care state in the reference touch-point map from a determination of the threshold percentage, where each don't care state is associated with a contact or no contact of a respective tactile sensor.

17. The method according to claim 12 further comprising:
controlling an actuator based on the gain or the control response ratio if the controller identifies a respective hand grip of the handle as an applicable gesture for the sampling interval.

18. The method according to claim 12 further comprising:
controlling the electrohydraulic valve based on the gain or control response ratio to decrease hydraulic flow to a second flow level that is lower than a first flow level if the controller identifies a finger grip of the handle as an applicable gesture for the sampling interval that is associated with fine control of an implement controlled by the electrohydraulic valve.

19. The method according to claim 12 further comprising:
determining if the handle is not contacted by a user's hand or fingers for a minimum threshold period;
generating an alert to a user interface if the handle is not contacted by a user's hand or fingers for a minimum threshold period.

* * * * *